US011898287B2

(12) United States Patent
Bauer et al.

(10) Patent No.: US 11,898,287 B2
(45) Date of Patent: Feb. 13, 2024

(54) TENTER-CLIP CARRIAGE FOR A CONVEYOR CHAIN ARRANGEMENT OF A STRETCHING SYSTEM AND AN ASSOCIATED STRETCHING SYSTEM

(71) Applicant: Brückner Maschinenbau Gmbh, Siegsdorf (DE)

(72) Inventors: Michael Bauer, Amerang (DE); Thomas Rott, Siegsdorf (DE); Markus Unterreiner, Marquartstein (DE); Daniela Schumacher, Kammer (DE); Matthias Mitterer, Übersee (DE); Anthimos Giapoulis, Traunstein (DE)

(73) Assignee: Brückner Maschinenbau GmbH, Siegsdorf (DE)

( * ) Notice: Subject to any disclaimer, the term of this patent is extended or adjusted under 35 U.S.C. 154(b) by 669 days.

(21) Appl. No.: 17/070,249

(22) Filed: Oct. 14, 2020

(65) Prior Publication Data

US 2021/0108347 A1    Apr. 15, 2021

(30) Foreign Application Priority Data

Oct. 15, 2019 (DE) ...................... 10 2019 127 701.9

(51) Int. Cl.
*D06C 3/04* (2006.01)
*B29C 31/00* (2006.01)
(Continued)

(52) U.S. Cl.
CPC ............. *D06C 3/04* (2013.01); *B29C 31/008* (2013.01); *B29C 55/20* (2013.01); *D06C 3/023* (2013.01);
(Continued)

(58) Field of Classification Search
CPC .......... D06C 3/04; D06C 3/023; D06C 3/025; D06C 3/02; D06C 3/021; D06C 2700/02;
(Continued)

(56) References Cited

U.S. PATENT DOCUMENTS 3,457,608 A * 7/1969 Gageur ................. D06C 3/023
26/93
3,500,515 A * 3/1970 Sclater .................... B29C 55/20
26/93

(Continued)

FOREIGN PATENT DOCUMENTS

CN     1930069 A      3/2007
CN   105008110 A     10/2015
(Continued)

OTHER PUBLICATIONS

Chinese Communication, one page, dated Mar. 10, 2022.
(Continued)

*Primary Examiner* — Amy Vanatta
(74) *Attorney, Agent, or Firm* — Nixon & Vanderhye P.C.

(57) ABSTRACT

A tenter-clip carriage for a stretching system comprises a longitudinal direction (LR) and a transverse direction and a clip body having a clamping device. The tenter-clip carriage comprises fastening portions in order to fasten the tenter-clip carriage to a partial chain portion of a conveyor chain arrangement of the stretching system. The tenter-clip carriage comprises at least one stabilising roller or at least one stabilising sliding element. The at least one stabilising roller or the at least one stabilising sliding element is, by means of a guide device:
  a) held directly on the tenter-clip carriage; or
  b) held indirectly on the tenter-clip carriage via a pin that connects two chain segments of the partial chain portion of the conveyor chain arrangement to one another
(Continued)

Figure 1:
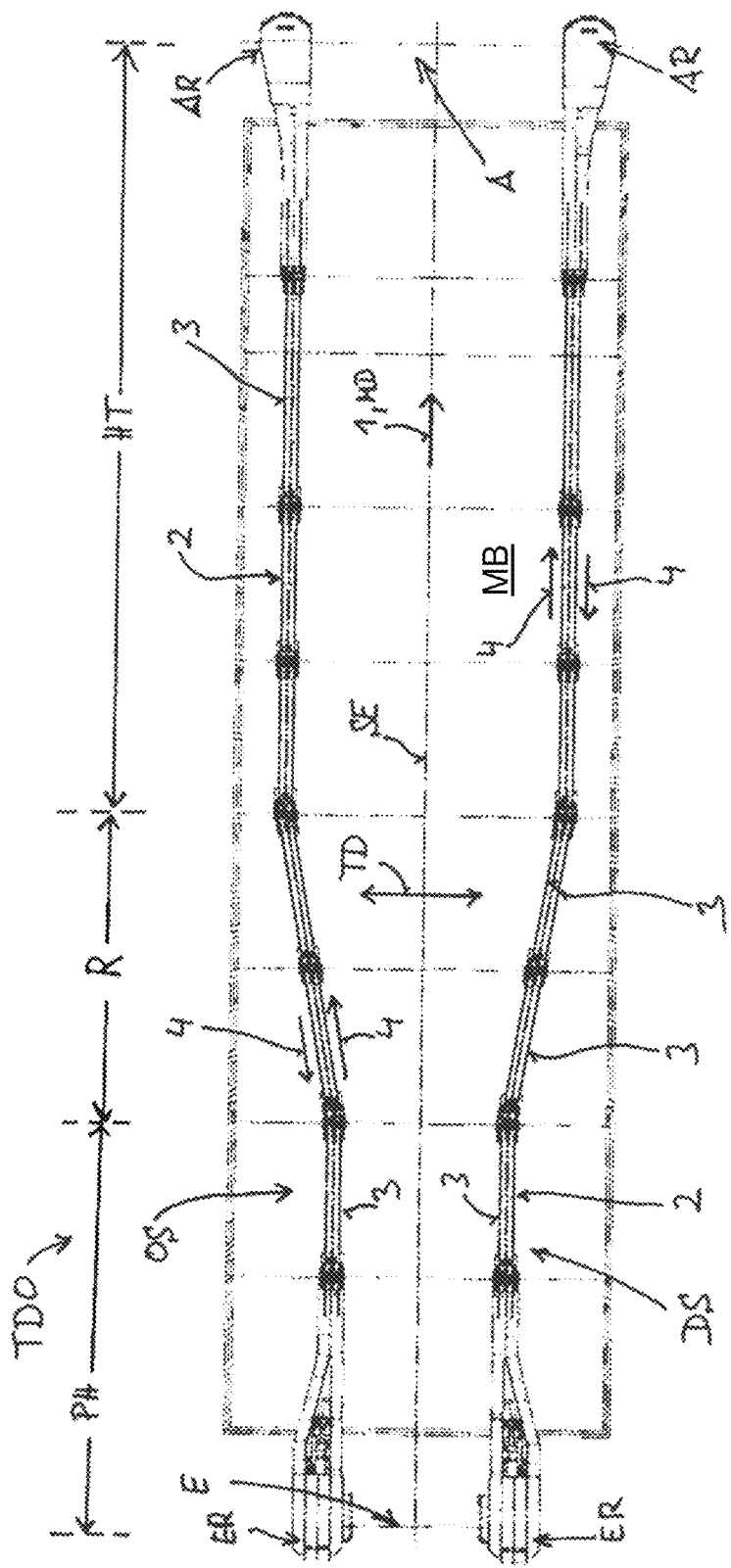

and, specifically, unaffected by the feed and drive forces acting on the tenter-clip carriage or the partial chain portion to move the tenter-clip carriage and/or the partial chain portion.

The at least one stabilising roller or the at least one stabilising sliding element can be adjusted perpendicularly or transversely to the longitudinal direction by a force accumulator or spring-force accumulator.

23 Claims, 14 Drawing Sheets

(51) Int. Cl.
  *B29C 55/20* (2006.01)
  *D06C 3/02* (2006.01)
(52) U.S. Cl.
  CPC ......... *D06C 3/025* (2013.01); *D06C 2700/06* (2013.01)
(58) Field of Classification Search
  CPC ............ D06C 2700/04; D06C 2700/05; D06C 2700/06; B29C 55/12; B29C 55/16; B29C 55/20; B29C 31/008; B29C 55/10; B65H 23/028
  USPC ..................................... 26/93, 89, 91, 96, 94
  See application file for complete search history.

(56) References Cited

U.S. PATENT DOCUMENTS

| | | | |
|---|---|---|---|
| 3,902,432 A | | 9/1975 | Shortridge et al. |
| 4,435,884 A | * | 3/1984 | Bosch ...................... D06C 3/04 26/93 |
| 4,674,159 A | * | 6/1987 | Sclater .................... B29C 55/20 26/93 |
| 4,723,345 A | * | 2/1988 | Pabst ....................... D06C 3/02 26/96 |
| 5,081,750 A | | 1/1992 | Mölz |
| 5,161,674 A | * | 11/1992 | Rutz ..................... B29C 55/165 26/73 |
| 5,390,398 A | * | 2/1995 | Rutz ..................... B29C 55/165 26/72 |
| 5,402,556 A | | 4/1995 | Rutz |
| 5,797,172 A | * | 8/1998 | Hosmer .................. B29C 55/20 26/93 |
| 5,924,180 A | * | 7/1999 | Lindner ................ B29C 55/165 26/72 |
| 2015/0314521 A1 | * | 11/2015 | Baumeister .............. B29D 7/01 425/112 |
| 2015/0328826 A1 | * | 11/2015 | Baumeister .............. B29C 55/12 425/403.1 |
| 2016/0151960 A1 | * | 6/2016 | Gumpinger ............. B29C 55/20 425/403.1 |
| 2016/0250801 A1 | | 9/2016 | Gumpinger et al. |
| 2019/0039282 A1 | | 2/2019 | Unterreiner et al. |
| 2020/0132118 A1 | * | 4/2020 | Swoboda ................ F16C 33/16 |

FOREIGN PATENT DOCUMENTS

| | | |
|---|---|---|
| CN | 105658411 A | 6/2016 |
| CN | 106660259 A | 5/2017 |
| CN | 208914592 U | 5/2019 |
| CN | 209466660 U | 10/2019 |
| DE | 39 28 454 | 3/1991 |
| DE | 3937855 C1 | 7/1991 |
| DE | 40 06 440 | 9/1991 |
| DE | 42 41 213 | 6/1994 |
| GB | 1080915 A | 8/1967 |
| JP | 51-98777 A | 8/1976 |
| JP | 04-505432 A | 9/1992 |
| JP | 2011-518695 A | 6/2011 |
| JP | 2019-107872 A | 7/2019 |
| TW | 201910102 A | 3/2019 |
| WO | 91/12962 A1 | 9/1991 |
| WO | 2009/132632 A1 | 11/2009 |
| WO | 2012168566 A1 | 12/2012 |

OTHER PUBLICATIONS

Japanese Office Action for Application No. 2020-172318, 10 pages, dated Oct. 2, 2023.
Examiner's English Comments on the JP Office Action, 2 pages.

* cited by examiner

TENTER-CLIP CARRIAGE FOR A CONVEYOR CHAIN ARRANGEMENT OF A STRETCHING SYSTEM AND AN ASSOCIATED STRETCHING SYSTEM

This application claims priority to DE Patent Application No. 10 2019 127 701.9 filed Oct. 15, 2019, the entire contents of which are hereby incorporated by reference.

The invention relates to a tenter-clip carriage for a conveyor chain arrangement of a stretching system and to an associated stretching system according to the preamble of claim 1.

Stretching systems are used in particular in the production of plastic films. In addition to so-called simultaneous stretching systems, in which a plastic film is stretched simultaneously in transverse and longitudinal directions, sequential stretching systems in particular are known, in which a plastic film is stretched in two successive stages, for example first in a longitudinal direction and then in a transverse direction (or vice versa) to create such a plastic film. Single-stage stretching systems, for example in the form of a longitudinal or a transverse stretching system, are also known.

The material web to be stretched, usually a plastic film, is gripped by means of clamping devices (so-called clips) that are arranged to be movable on circumferential guide tracks on both sides of the material web to be stretched. The clips are successively moved from an inlet zone (in which the edge of a plastic film to be stretched, for example, is detected) via a stretching zone (in which the opposing clips on the guide rail portions with a transverse component are moved away from each other divergent to the transport direction) to an outlet zone and then on the return path back to the inlet zone, in which case the film may for example undergo a certain relaxation and/or post-heat treatment in the outlet zone.

The above-mentioned sequential or transverse stretching systems usually have two circumferential guide tracks arranged symmetrically with respect to a vertical plane of symmetry, wherein each guide track comprises a partially or fully circumferential guide rail along which so-called tenter-clip members or tenter-clip carriages are transported or moved. Particularly when the tenter-clip carriages are driven by means of revolving chain systems, chain wheels are usually provided at least at the outlet zone and, if necessary, at the inlet zone, via which chain wheels the revolving chain is moved and driven.

The clips are therefore required for the longitudinal movement of the material web, in particular in the form of a film to be stretched. The clips or tenter-clip carriages are usually attached to revolving chains (endless chains), which are movably arranged on both sides of the material web to be stretched on the circumferential guide tracks mentioned. Furthermore, simultaneous stretching systems without chain systems are known, in which the tenter-clip carriages are driven by linear motor drives, in which successive tenter-clip carriages are moved by way of electromotive forces.

In the actual stretching zone, the guide tracks run on diverging paths such that the lateral distance between the clips that can be moved on the two lateral circumferential paths increases. The film is stretched in the transverse direction.

The tenter-clip carriages themselves can be mounted opposite the guide rails by means of rollers and/or using sliding elements. Mixed systems consisting of rollers and sliding elements are also possible.

Particularly when stretching systems use circulating transport chains to move the tenter-clip carriages along the guide tracks, there is the problem that the contact of the rollers or the sliding elements cannot be 100% guaranteed on the rolling or sliding surfaces of the guide rail system. It is even possible to clamp the guide rollers or sliding elements, namely if the rollers or the sliding elements are rigidly arranged on the chain.

However, clamping the rollers or sliding elements leads to overloading of the rollers or sliding elements and thus to a shorter service life. However, greater overall damage may also occur.

This may have several causes, namely:
a) there may be manufacturing tolerances on the components, in particular on the guide rail, on the guide carriages and on the rollers rolling on the guide rails or the sliding elements sliding longitudinally here, and/or
b) there are variable effective rail thicknesses along the guide rail arrangement, as can be seen in principle in the curvature of the guide rails.

However, if the rollers or sliding elements are not in 100% contact with the guide surfaces of the guide rails, the following effects may occur:
a) the rollers or the sliding elements have no continuous contact with the rolling or sliding surfaces of the guide rail arrangement, which means that the rollers or the sliding elements may temporarily, at least briefly, lift off the guide rail arrangement and then set down again such that this results in permanent shock loads, and/or
b) in particular when using rollers, it may happen that they do not rest on the rolling surface of the guide rail arrangement and their speed therefore decreases such that when the rollers are set down they have a speed relative to the guide rail. The consequence of this is that the outer rings of the rollers have to be accelerated and, in the meantime, sliding effects occur between the relevant rolling surfaces of the guide rail and the outer ring of the rollers. In addition, the rolling geometry may also be affected in this way.

Against this background, attempts have already been made to find solutions that at least reduce these disadvantages.

For example, it has already been proposed not to manufacture the guide rails for the guide rail arrangement from an integral, rigid (monolithic) alloy material but to use flexible guide rails, which consist of a bundle of guide rail strips running parallel to one another and thereby produce a certain degree of resilience. As a result, the distance between the opposing rolling surfaces should always be compensated such that all rollers roll on the rolling surfaces of the guide rail arrangement assigned to them.

However, in this context it should be considered disadvantageous that the straight-line configuration of the guide rail arrangement worsens and thus additional vibration excitations are generated for the chain system. In addition, the shape deviation of the bands is subject to fluctuations that cannot be specifically controlled, resulting in an undefined level of force.

For this reason, flexible roller rails with an integrated, defined suspension have also been proposed. However, this leads to a significant increase in the installation space required for this.

However, the installation space is very limited in corresponding stretching systems such that, on the other hand, guide rail arrangements with the smallest possible rail thickness are preferred. In addition, multi-part rail cross-sections are more complex and therefore more costly.

As an alternative to the above-mentioned solutions, it has also already been proposed to mount the rollers of a tenter-clip carriage on different components depending on the respective rail side.

DE 40 06 440 C2 proposes, for example, mounting one or more rollers directly on the side of the tenter-clip carriage facing away from the film, which then roll on the side of the guide rail facing away from the film. The at least one roller provided for this purpose on the opposite side of the guide rail is then not mounted on the tenter-clip carriage, but on the chain arrangement connecting the individual clips via chain levers. This results in a degree of freedom in the adaptation of the roller spacing to the roller rail or roller rail bundle thickness.

This at least one roller, which is mounted on the chain, enables this roller to be held in a variable position with respect to the tenter-clip carriage under continuous pretension in the transverse direction to the guide rail. The tensile forces introduced via the chain levers act on the roller in the sense of a force deflector in such a way that the chain tension that is generated by the tensile forces transmitted from one chain carriage to the next is converted into a pretensioning force that is directed substantially transversely to the associated rolling surface, thus exerting pressure on the roller.

In other words, the longitudinal pull in the chain levers is divided into a longitudinal and a transverse force if the chain levers are not precisely in the pulling direction.

The roller, which can be adjusted and subjected to force in this way, is seated on a chain lever arrangement deviating from an angle of 180°, which ultimately results in distribution of force by the chain tensile forces, namely in the direction of travel relative to the guide rail on the one hand and perpendicular thereto on the other hand. As long as the chain links in the straight roller rail region have a corresponding angle between the two chain levers supporting the adjustable roller, a corresponding transverse force is generated that brings the roller into contact.

The device described in DE 40 06 440 C2 achieves very good results in current film stretching systems. At high speeds and with an increasing system length, however, the transverse force generated in this way is always dependent on the one hand on the angle of the two chain links supporting the roller and, above all, on the drive and longitudinal tensile forces introduced, with the forces in turn also being reduced by the coefficient of friction of the connecting pins connecting the chain levers.

In other words, the contact force of the adjustable roller is dependent on the longitudinal pull of the chain and is therefore very variable.

In the case of high longitudinal chain pulls and high speeds as well as an increasing system length, which may be expected in the future, very high contact forces occur on the roller, whereas these contact forces may not be sufficient in the case of a low longitudinal chain pull. The contact force is also dependent on the coefficient of friction of the articulated connections. In the case of very high coefficients of friction in conjunction with high speeds and an increasing system length of future film stretching systems, the roller could then no longer rest on the rolling surface of the guide rail assigned to it.

Based on this prior art, the object of the invention is to create an improved solution for a chain-based stretching system, in which the rollers and/or sliding elements, which are longitudinally guided on a guide rail arrangement, are to be kept in constant contact even at high system speeds and regardless of the system length.

The object is achieved according to the invention with respect to a tenter-clip carriage for a conveyor chain arrangement of a stretching system according to the features specified in claim 1 and with regard to a stretching system equipped with a conveyor chain according to the features specified in claim 17. Advantageous embodiments of the invention are specified in the dependent claims.

The solution according to the invention is based on the fact that the pressing force of at least one roller or at least one sliding element on an associated guide rail arrangement is decoupled from the drive forces that act on the tenter-clip carriage and/or chain links and is independent thereof, i.e. is in particular independent of a longitudinal chain force in the case of a stretching system in which the individual tenter-clip carriages are driven by connecting chain links and passed through the stretching system. This applies regardless of whether the individual tenter-clip carriages are connected to one another via separate chain links (such that the force flux of the driven chain arrangement runs across the individual tenter-clip carriages), or whether a continuous chain arrangement is used in which the clips are mounted as a separate component on the chain and are not disposed in the force flux of the longitudinal chain pull.

According to the invention, a tenter-clip carriage is assumed that has one or more rollers and/or one or more sliding elements on the side of the guide rail arrangement remote from the material web that are generally held and mounted on the tenter-clip carriage in a fixed and rigid manner and thus are not adjustable at least in the transverse direction of the tenter-clip carriage. The film and/or stretching forces in particular may be optimally supported by these rollers and/or sliding elements.

On the opposite side, i.e. the side facing the film, at least one or more compensating rollers and/or one or more compensating sliding elements are then provided, which can be adjusted with respect to the tenter-clip carriage in at least one component running transversely to the guide rail arrangement in order to produce the desired pressing force while ensuring play-free contact with the rolling or sliding surfaces of the guide rail arrangement. Instead of a compensating roller or a compensating sliding element, reference will often be made hereinafter to a stabilising roller or a stabilising sliding element.

It would also be possible for a plurality of stabilising rollers to be used, wherein at least one stabilising roller is arranged in each case on the side facing the film and on the side remote from the film (facing away from the material web). These (at least two) stabilising rollers are arranged offset from one another in the vertical direction. One stabilising roller is arranged closer to the upper load-bearing rail surface of the guide rail of the guide rail arrangement than the other stabilising roller and the other stabilising roller is arranged closer to the (lower) opposing rail surface of the guide rail, which opposing rail surface is arranged opposite to the upper load-bearing rail surface. In this case, the rollers or the sliding elements are also arranged both on the side facing the film and on the side remote from the film. The respective one roller or a pair of rollers or sliding elements is arranged approximately (deviation less than +−20%) at the level of the respective stabilising roller, but on the other side of the guide rail. The guide rail runs between the roller and the corresponding stabilising roller or stabilising sliding element.

The invention further proposes using at least one pressurised compensating roller or at least one pressurised compensating sliding element in order to ultimately also keep the wheels or longitudinally-sliding sliding elements rolling on the opposite side of the guide rail or the guide rail arrangement in constant contact with the associated rolling or sliding surface of the guide rail arrangement.

In the context of the invention, it has proven to be particularly advantageous if the compensating or stabilising units, i.e. the at least one stabilising or compensating roller or the at least one stabilising or compensating sliding element, are seated on a lever arrangement to which pressure is applied using the desired force accumulator or spring-force accumulator, preferably in the form of a spring device.

Such a spring-loaded stabilising roller or such a spring-loaded stabilising sliding element allow the contact of the stabilising rollers and/or the stabilising sliding elements to be ensured largely independently of the operating conditions, i.e. largely independently of the speed, product and/or contamination conditions. The disadvantages outlined in the prior art are thus overcome even at high system speeds and system lengths.

The spring-loaded stabilising rollers or the spring-loaded stabilising sliding elements are fully sufficient to stabilise the tenter-clip carriages on the guide system in order to be able to always compensate for defects in the form of thickness tolerances, unevenness or changes in geometry on the rolling rail. Above all, however, the minimised mass of the spring-loaded stabilising roller or the stabilising sliding element enables a system to be implemented that can react in a highly dynamic manner, with the main masses being able to move uniformly on the guide system, i.e. the guide rail arrangement.

The at least one spring-loaded stabilising roller or the at least one spring-loaded stabilising sliding element is, by means of a guide device:
a) held directly on the tenter-clip carriage and in particular on the clip body; or
b) held indirectly on the tenter-clip carriage and in particular on the clip body and/or connected thereto via at least one pin that connects two chain segments of the partial chain portion of the conveyor chain arrangement to one another.

The direct holding can take place, for example, by mounting the guide device on the tenter-clip carriage. This could be done using a pin that is non-rotatably connected, in particular screwed or welded, to the tenter-clip carriage. The guide device would then be mounted on this pin.

The indirect holding may take place, for example, by the pin, which connects two chain segments of the partial chain portion, itself being (rotatably) mounted on the tenter-clip carriage and being partially movable relative thereto. It could, for example, be inserted into an opening of the fastening device of the tenter-clip carriage and held therein without screws. The two chain segments are preferably located directly next to the tenter-clip carriage. In particular, the tenter-clip carriage is arranged in parallel on these chain segments. The pin could optionally also be arranged on a fastening portion of the tenter-clip carriage and screwed thereto. The indirect holding could optionally also take place by mounting the guide device on a pin that connects two chain segments of the partial chain portion of the conveyor chain arrangement to one another, with another pin that connects adjacent chain links to one another being connected to the tenter-clip carriage or being mounted thereon. In this case, the indirect holding would take place via two pins and a plurality of chain links.

According to the invention, the system forces the construction according to the invention can be adapted precisely and very flexibly to the requirements of the system (in particular the system speed and system length).

The solution according to the invention is suitable for all such devices for the transport of moving material webs using clips that are driven along guide rail arrangements by means of chain drive systems. This also applies regardless of whether the individual tenter-clip carriages are connected to one another via separate chain links (such that the force flux of the driven chain arrangement runs across the individual tenter-clip carriages), or whether a continuous chain arrangement is used in which the clips are mounted as a separate component on the chain and are not disposed in the force flux of the longitudinal chain pull.

The solution according to the invention can be implemented if, for example, a mono-rail is used as the guide rail, but also if two guide rail portions offset one above the other are used in the manner of a duo-rail on which the illustrated rollers or sliding elements of the tenter-clip carriage engage and are longitudinally movable.

Figure 2:
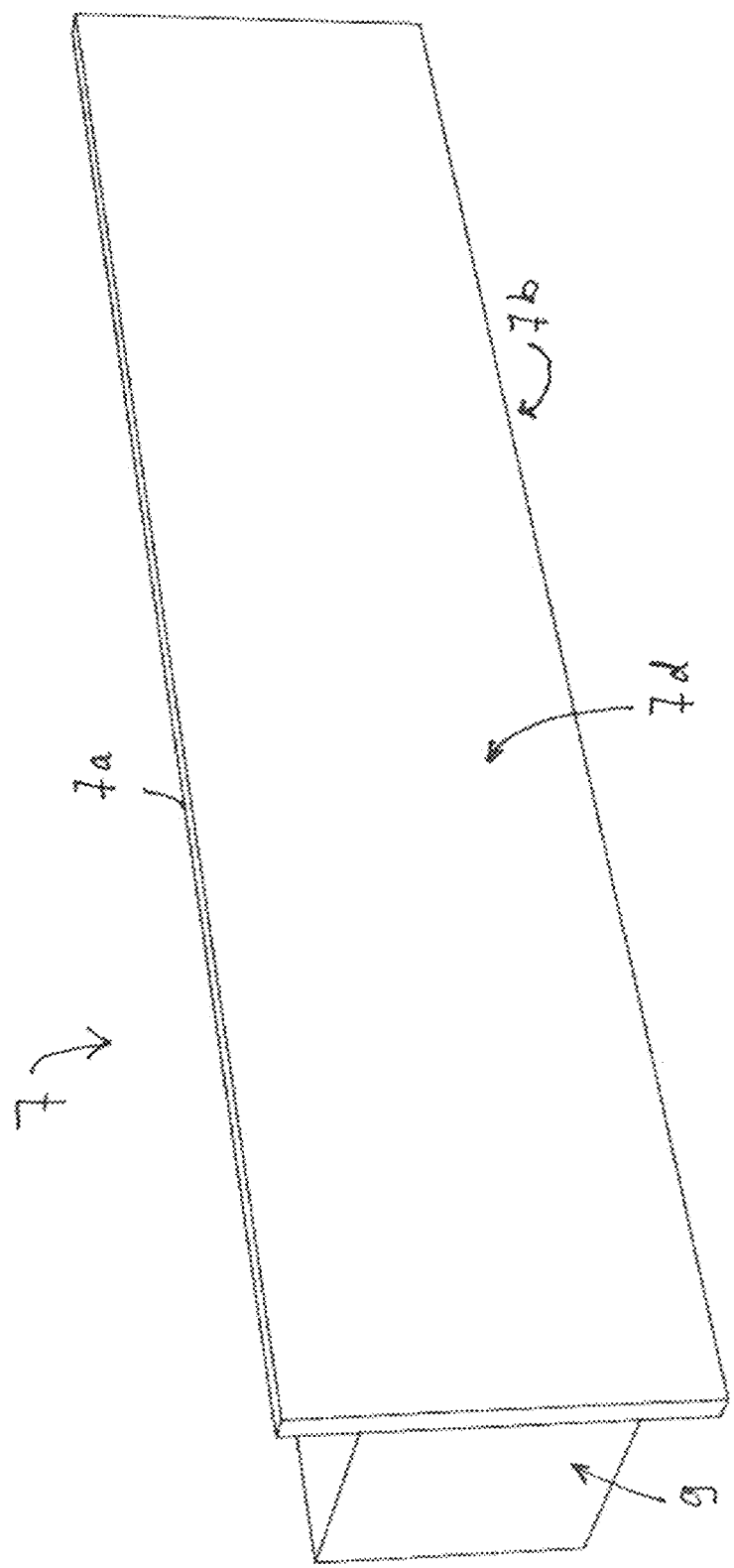
Figure 3:
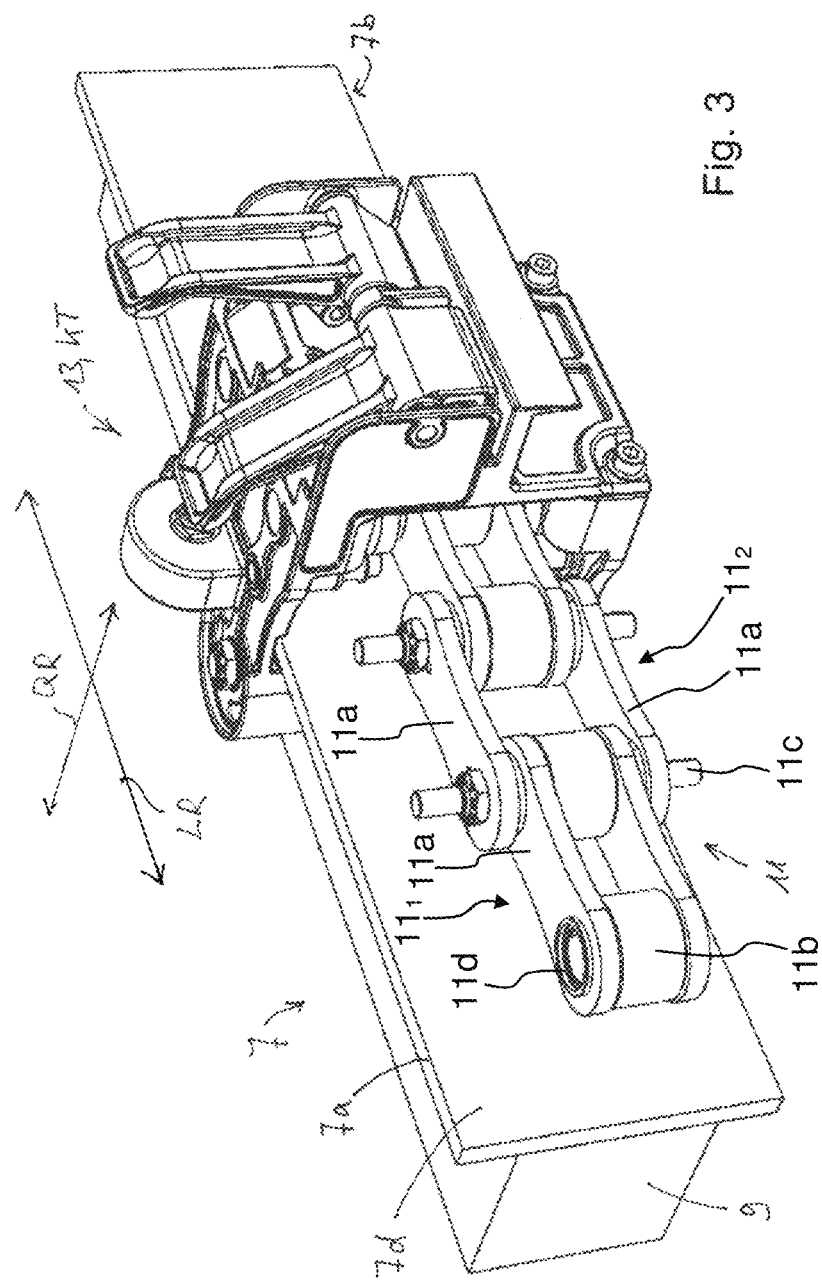
Figure 4:
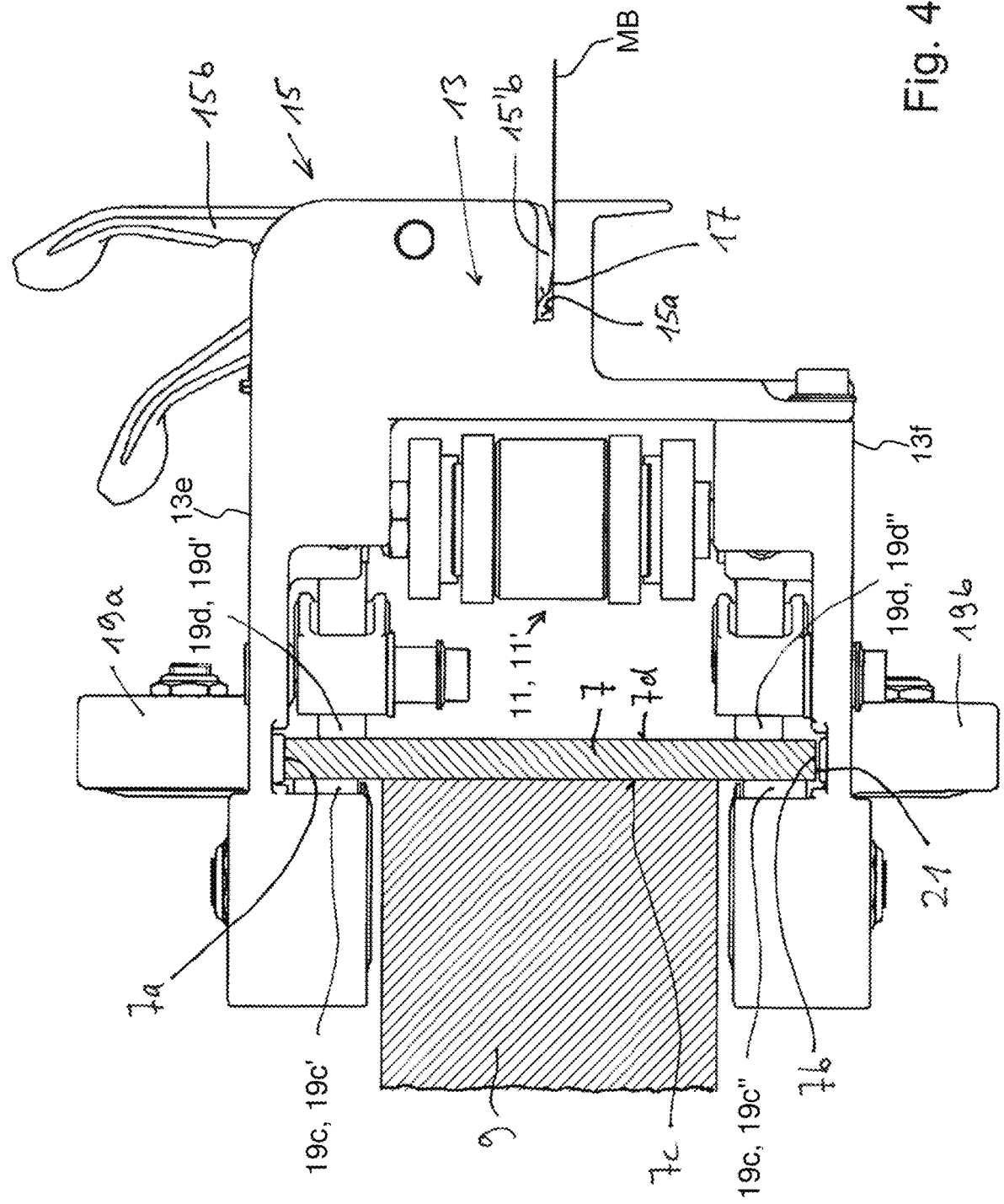
Figure 5:
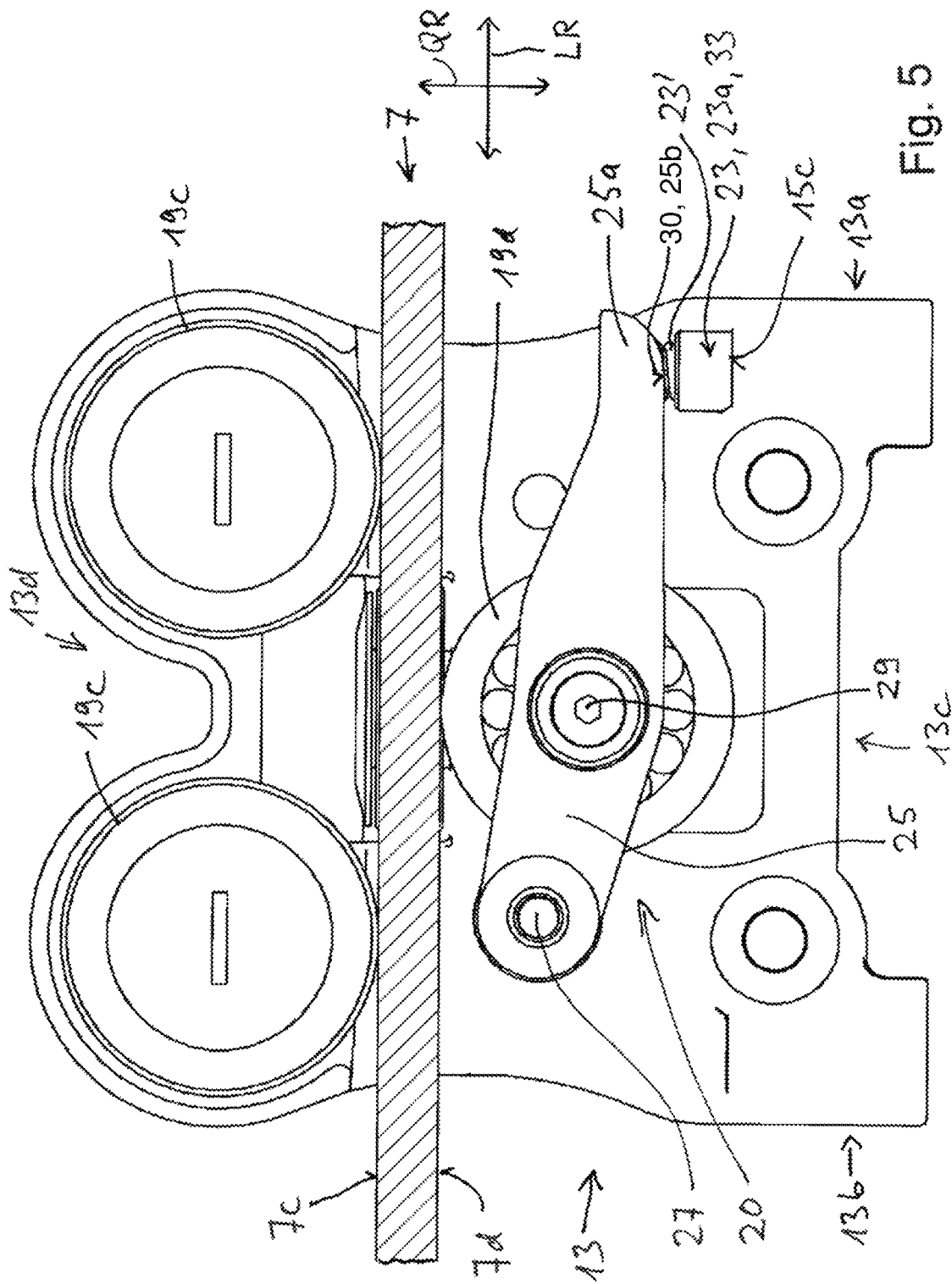
Figure 6:
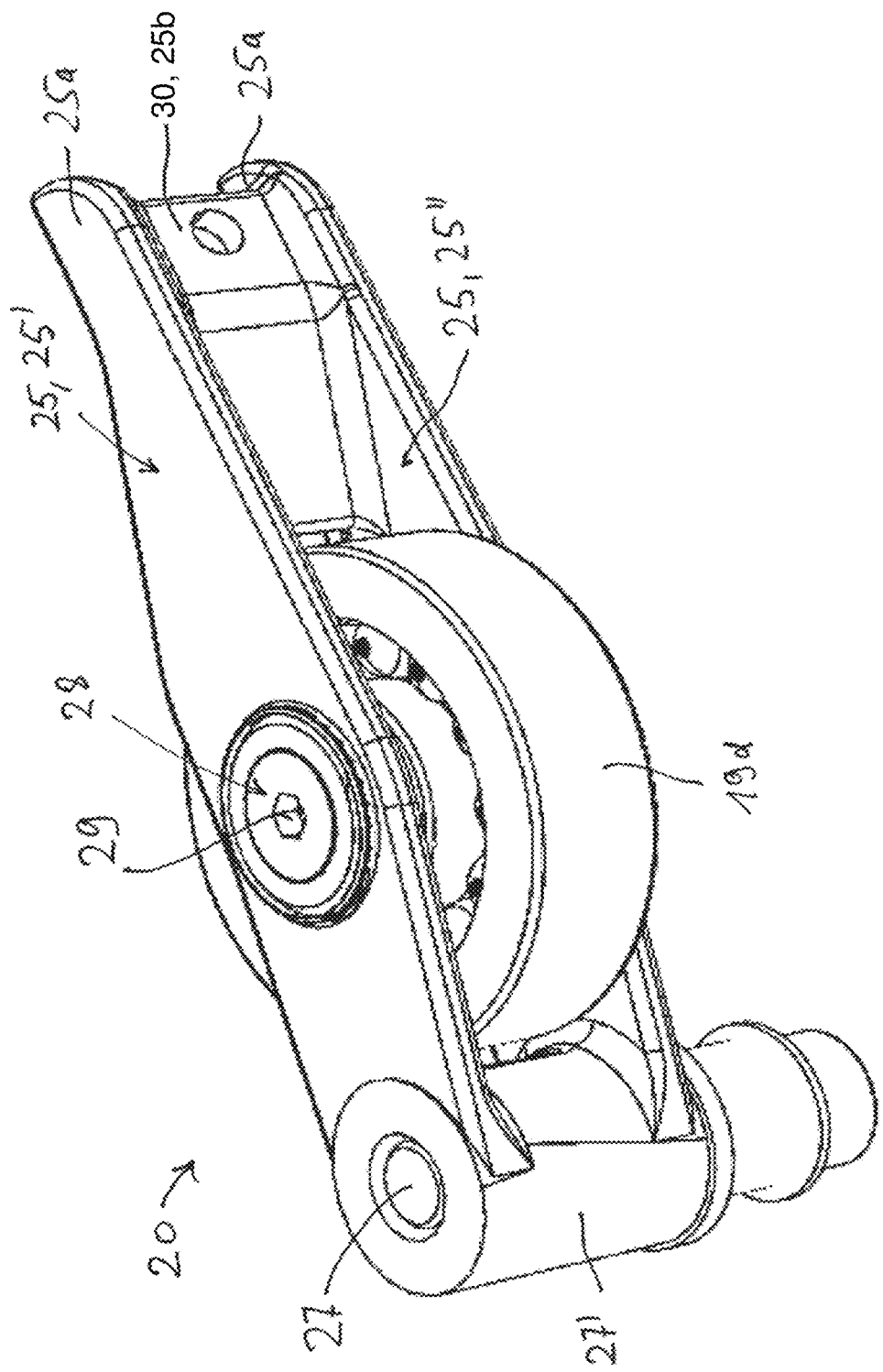
Figure 7:
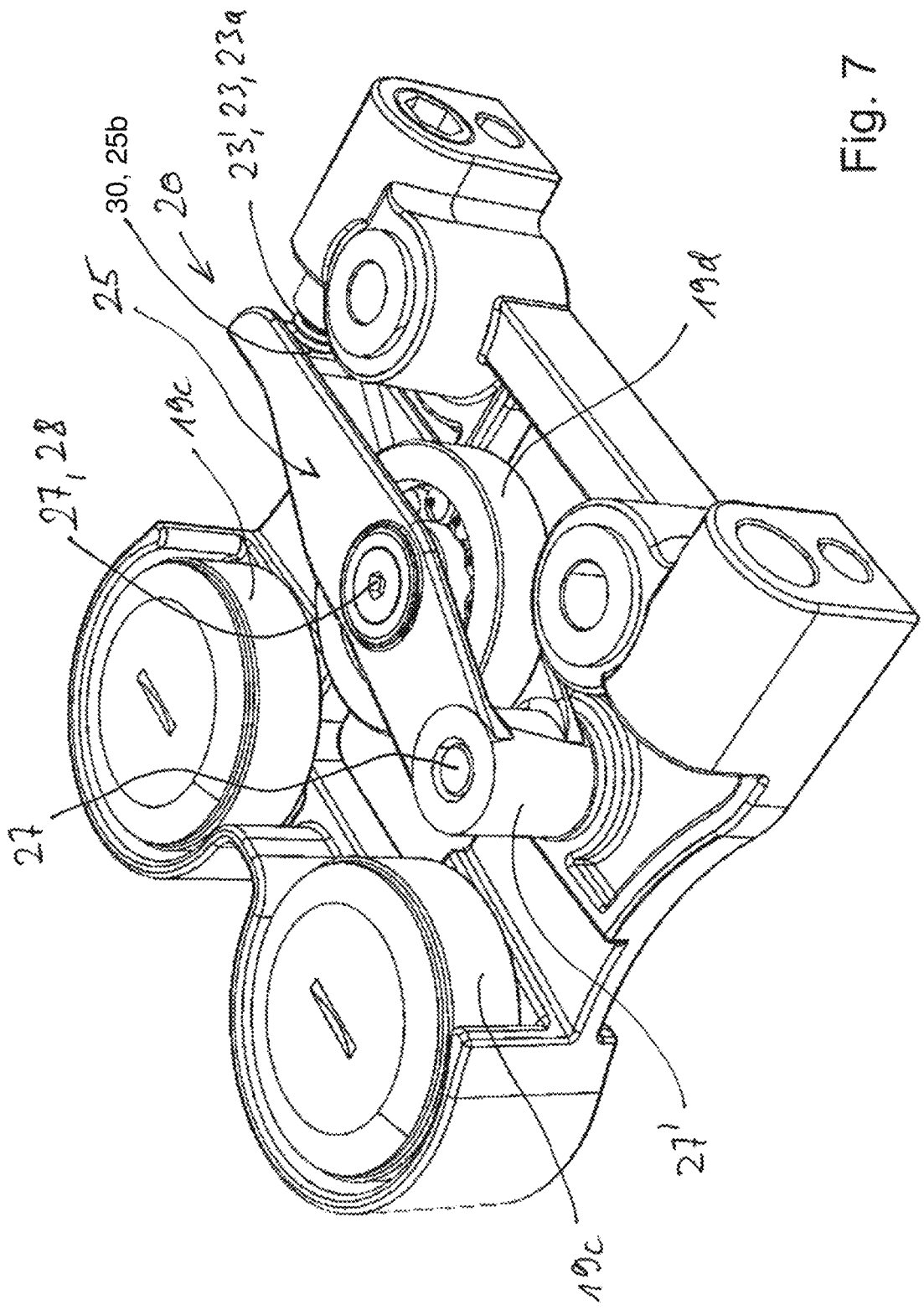
Figure 8:
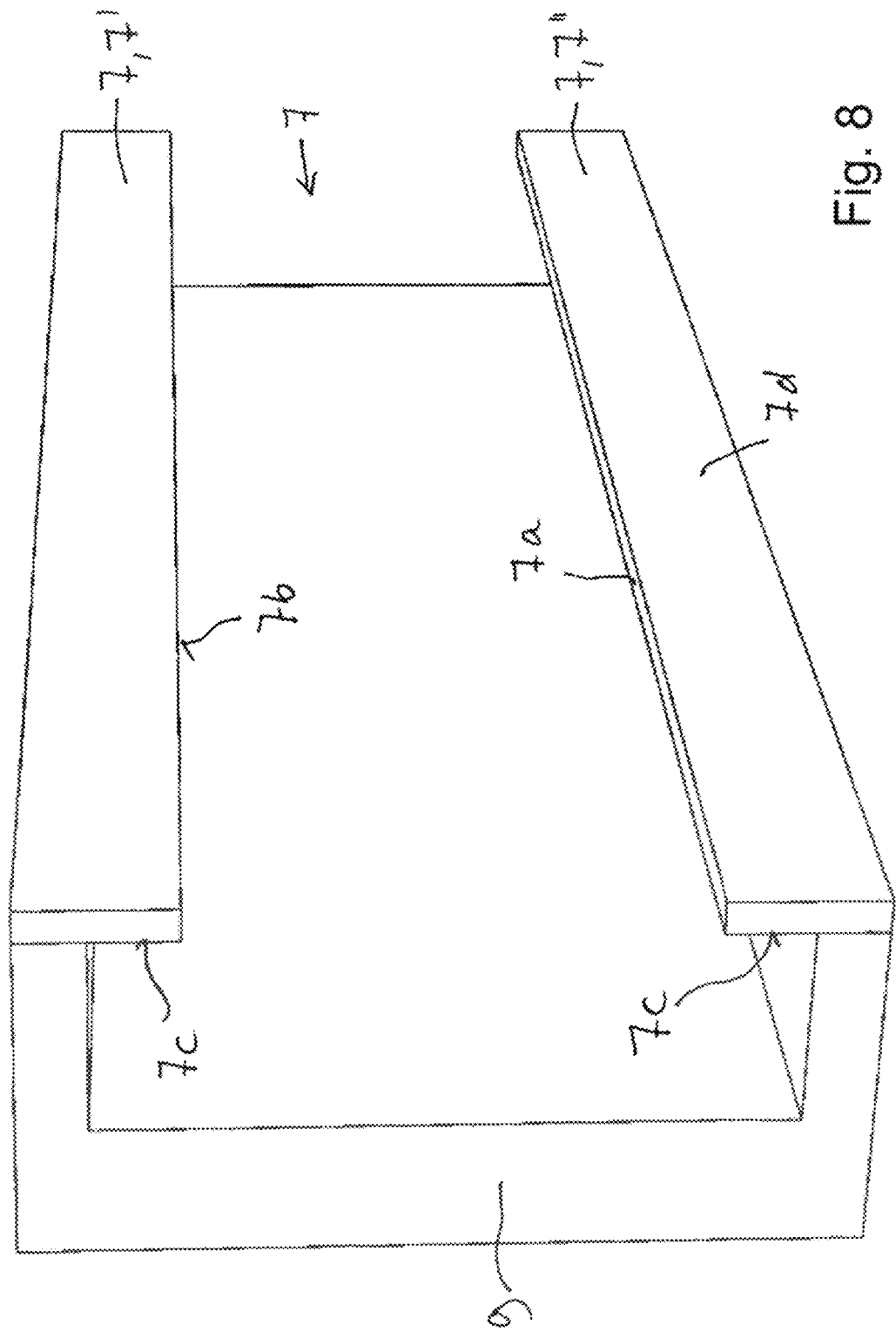
Figure 9:
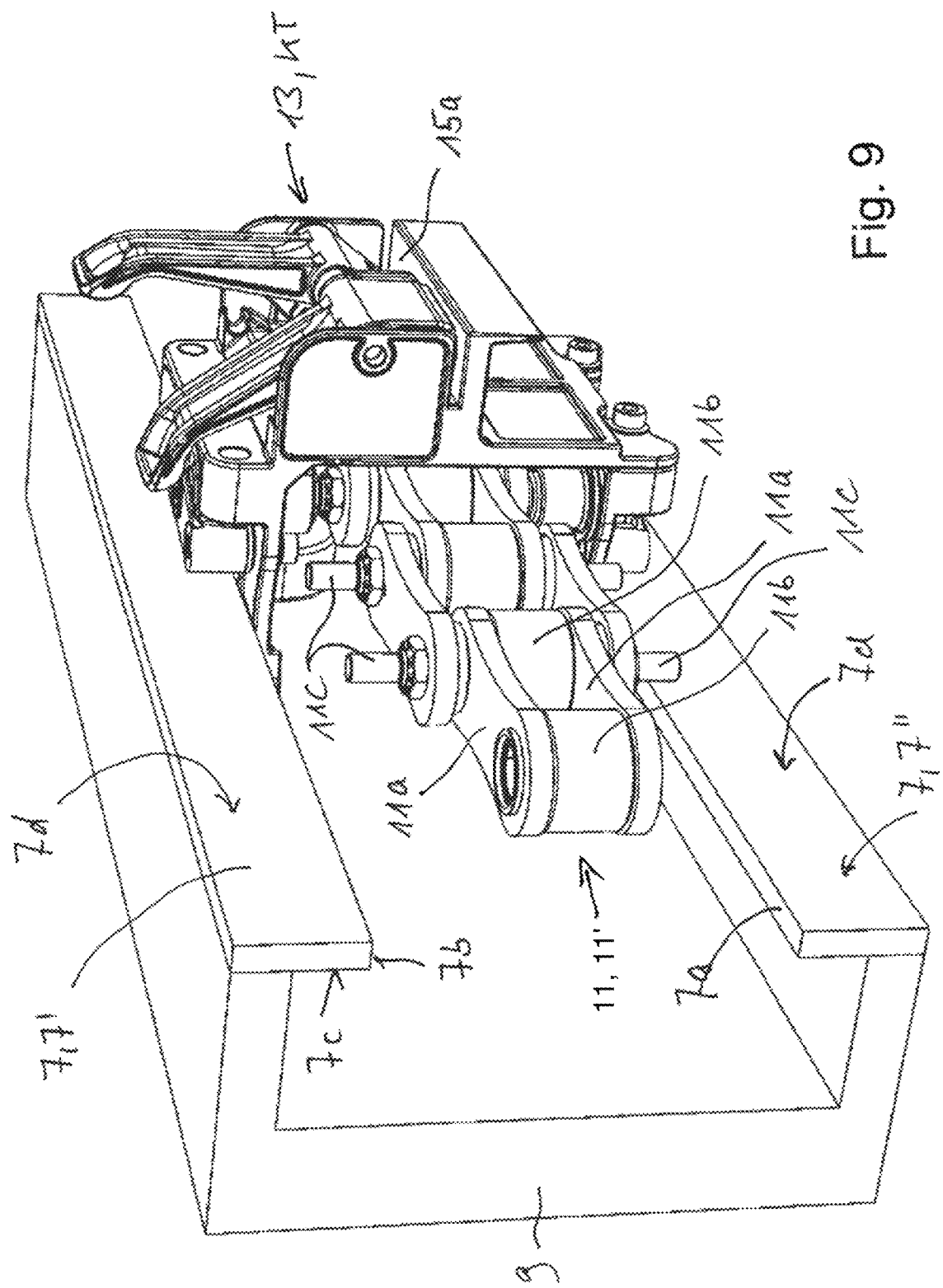
Figure 10:
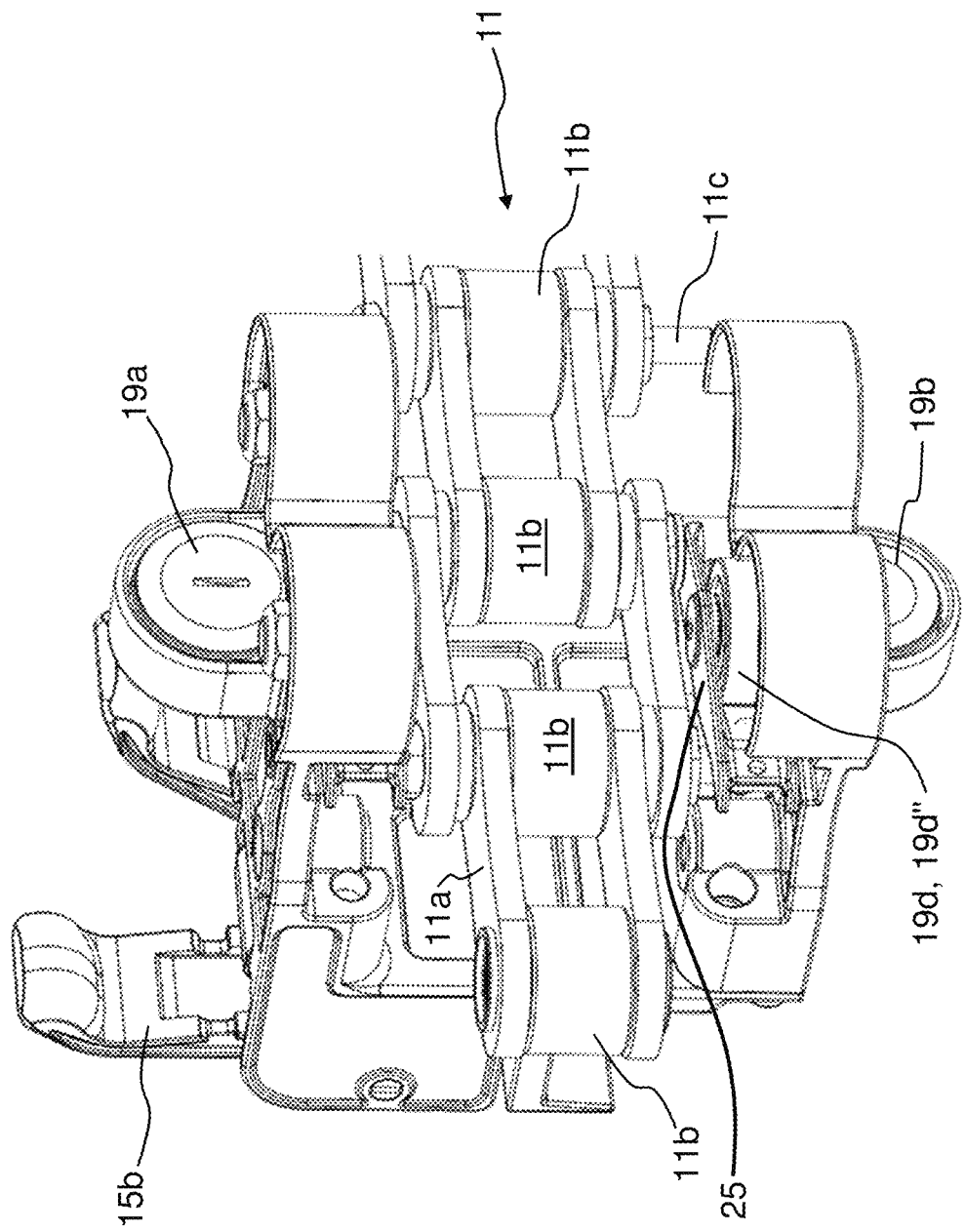
Figure 11:
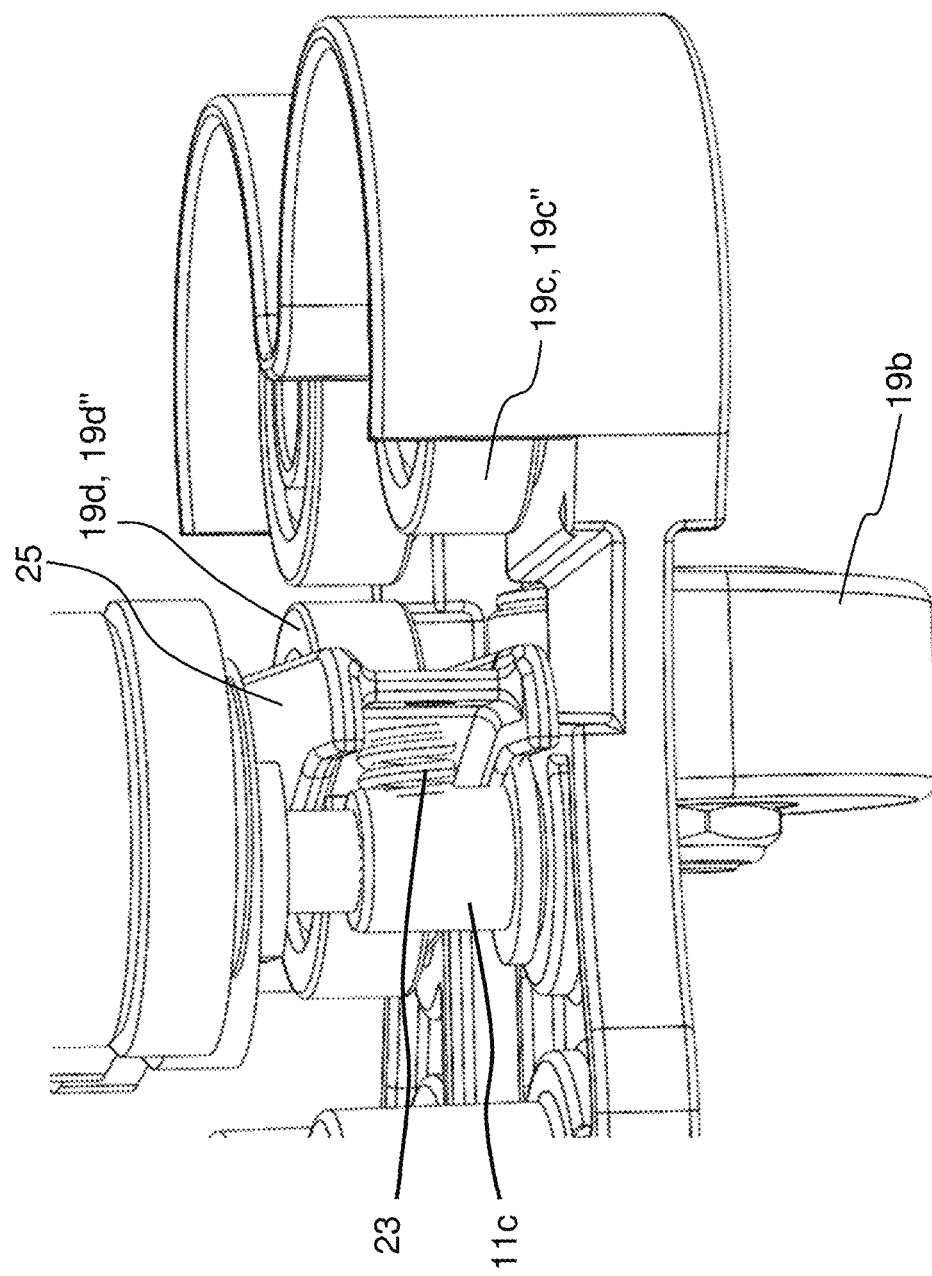
Figure 12:
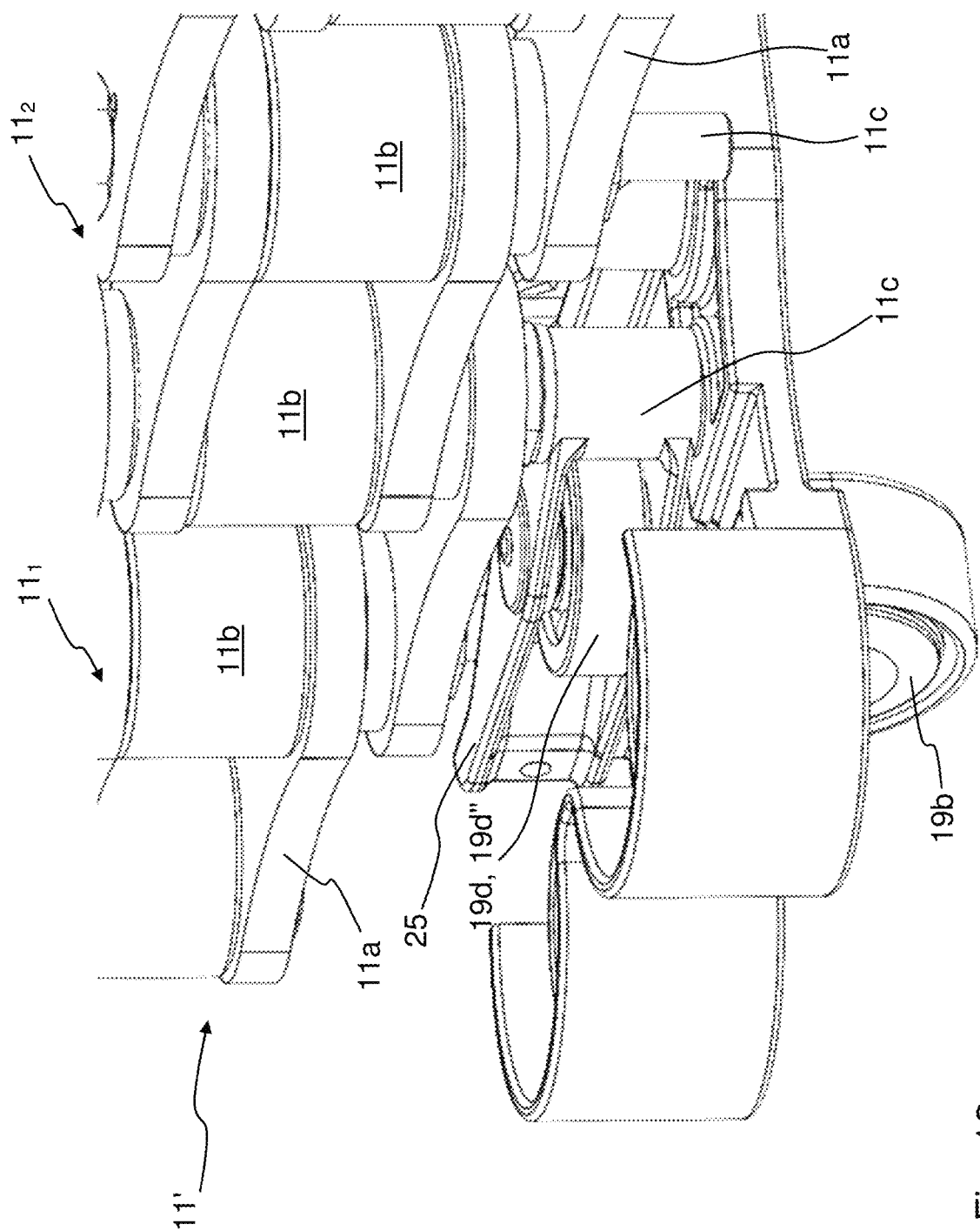
Figure 13:
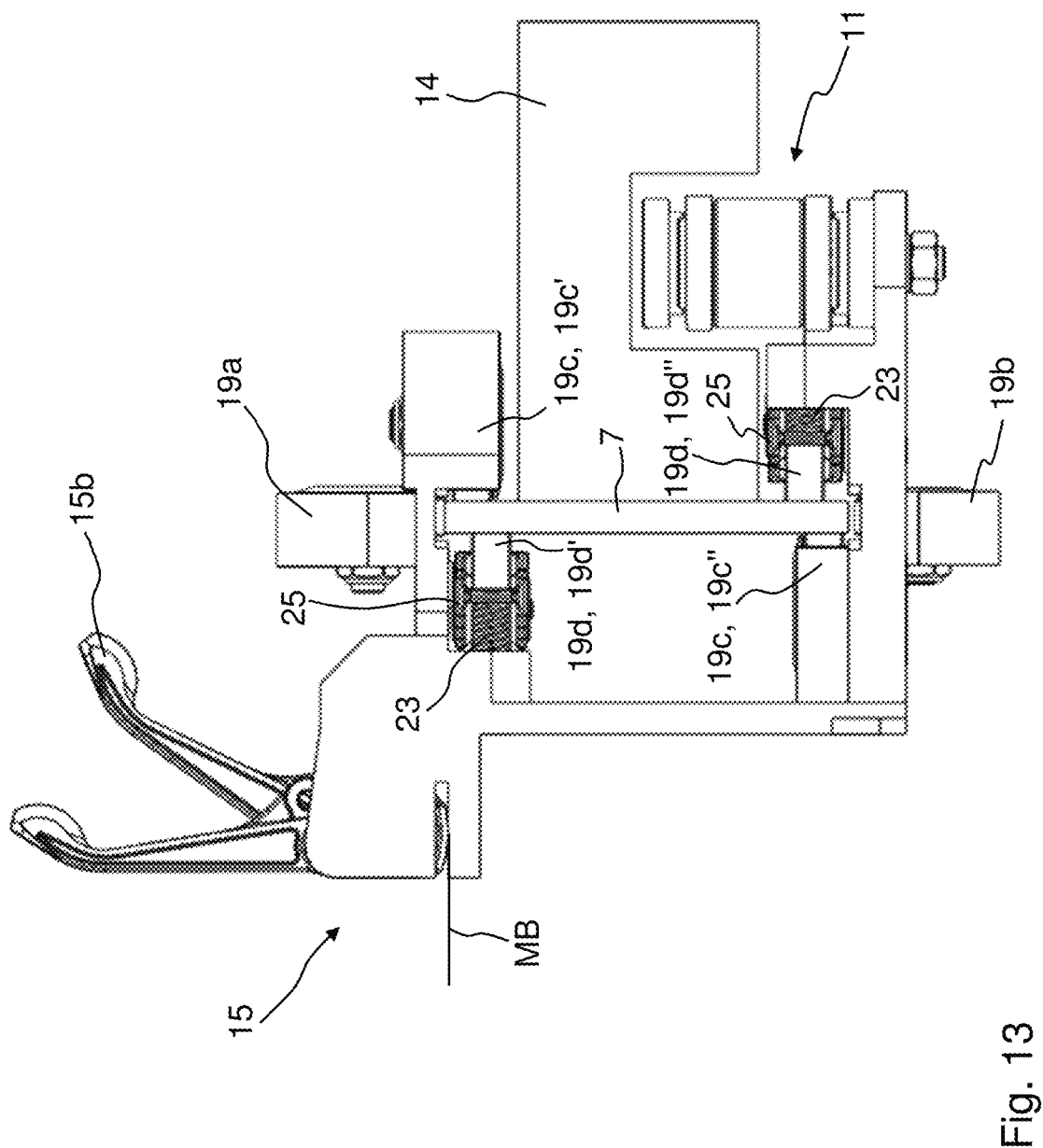
Figure 14:
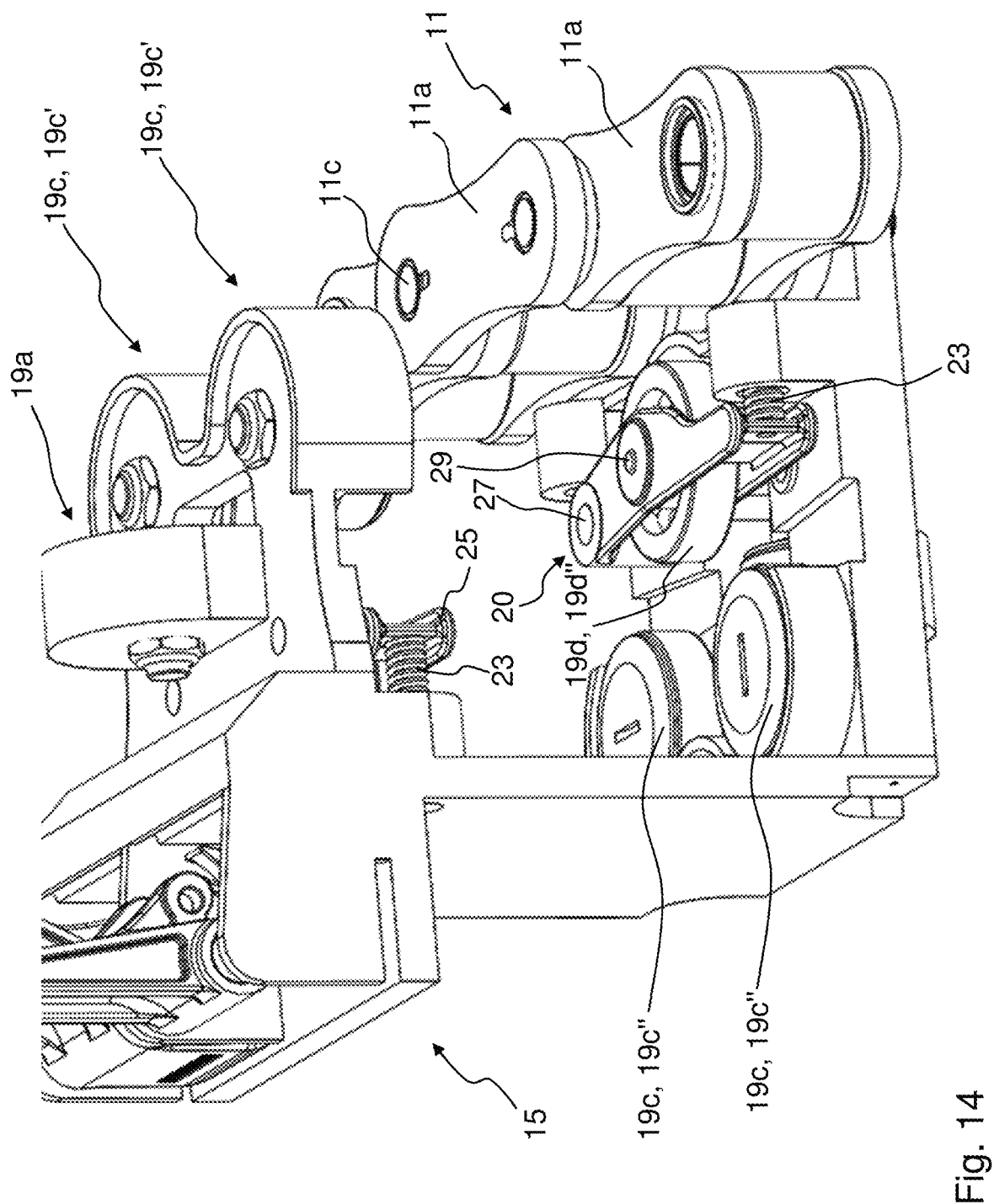

The invention will be explained in more detail hereinafter with reference to drawings. In detail:

FIG. 1: is a schematic plan view of a transverse stretching system;

FIG. 2: is a perspective view of a guide rail in the manner of a mono-guide rail;

FIG. 3: is a partial representation of a stretching system with a chain conveyor system and a tenter-clip carriage in front of the guide rail shown with reference to FIG. 2;

FIG. 4: is a vertical cross-sectional view through the guide rail shown in FIGS. 2 and 3 with the tenter-clip carriage that can be moved thereon on the chain system;

FIG. 5: is a schematic plan view of a horizontal section through a tenter-clip carriage on an associated guide rail;

FIG. 6: is a detail of a spatial representation of a pivotable stabilising roller mounted according to the invention;

FIG. 7: is an illustration similar to FIG. 6 in which the pivotably mounted stabilising roller is shown in the installed position in the lower part of the tenter-clip carriage;

FIG. 8: shows a configuration of a guide rail that differs from FIG. 2 with the formation of two guide rail portions;

FIG. 9: is a representation of a solution according to the invention that differs from FIG. 3 in the case of a guide rail arrangement divided into two parts according to FIG. 7;

FIG. 10: shows an arrangement in which the stabilising roller is arranged on the chain system;

FIG. 11: shows the arrangement from FIG. 10 in a different perspective;

FIG. 12: shows an arrangement in which the stabilising roller is arranged on the chain system via a pivot lever, wherein the pivot point of the pivot lever is concentric with a chain pin;

FIG. 13: is a sectional view through an arrangement in which a first stabilising roller is arranged on the side facing the film and a second stabilising roller is arranged on the side remote from the film; and FIG. 14: is a three-dimensional representation of the arrangement from FIG. 13.

Reference is made below to FIG. 1, in which a transverse stretching system, in which the invention can be implemented, is shown by way of example.

The film widthwise or transverse stretching system described below, which is also referred to below in short as a TDO stretching system (TDO=transverse direction orientation), is known to have two drive systems, which are generally symmetrical. FIG. 1 shows the two drive systems running vertically in the plane of the drawing and arranged symmetrically to the plane of symmetry SE, wherein the material web, in particular in the form of a plastic film MB (material web), to be treated, i.e. to be stretched, is moved along the extraction direction 1 in the machine direction MD between the two drive systems circulating on closed guide tracks 2. The illustrated TDO stretching system may also be part of a sequential stretching system, which usually comprises a longitudinal stretching stage upstream of the transverse stretching system (transverse stretching frame) (in case of doubt, this longitudinal stretching stage may also be arranged downstream of the transverse stretching stage).

A monoaxial or uniaxial film MB (if a longitudinal stretching system is upstream of the transverse stretching system shown) or an unstretched film MB (in the following, this is referred to as a film or a sheet, although a treatment web MB can generally be treated and transversely stretched accordingly with such a stretching system such that the invention is not limited to a plastic film web but can also be used for stretching other web-shaped materials or material webs, such as metal foils, nets, fabric webs, etc.) enters the stretching system in the inlet region E where it is gripped and clamped by clips on both lateral edges, namely on the operator side (OS) and the drive side (DS). The film MB is then heated in a subsequent preheating zone PH and then fed to a stretching zone R in order to stretch the film MB in the transverse direction TD here. The stretched film MB then passes through various heat treatment zones HT, in which the film can also be relaxed. At the end of the stretching system in the outlet zone A, the film is unclipped by suitable means and then leaves the transverse stretching machine, i.e. the transverse stretching system.

A conveyor system 3 is therefore driven in the direction of rotation 4 on each of the two circulating tracks 2, for which purpose the two conveyor systems comprise a plurality of tenter-clip conveyor units KT.

FIG. 1 also shows an outlet wheel AR for each closed circumferential guide track 2 in the outlet region A and an inlet wheel ER for each guide track in the inlet region E. The circulating conveyor system 3 is driven via the driven outlet wheel AR, wherein the inlet wheel ER is possibly also able to be driven under partial load.

In principle, the solution according to the invention, which will be discussed below, can also be used in mechanical simultaneous stretching systems.

Even in the previously known mechanical simultaneous stretching systems, the tenter-clip conveyor units (i.e. the so-called tenter-clip carriages) are supported by rollers on the top and bottom that rotate on horizontal and vertical axes as well as on the two horizontally opposite vertical sides of a guide and weight-receiving rail. In addition, there is also a control rail via which the spacing of the clips or conveyor units from one another in the region of the diverging simultaneous zone in the machine direction (MD) may be set differently via chain scissor links of a so-called scissor-type lattice (pantograph). It is known that in this stretching region in simultaneous stretching systems, the conveyor units and thus the clips sitting thereon are accelerated increasingly faster such that the distance between successive clips becomes increasingly larger in order to simultaneously effect longitudinal and transverse stretching of the plastic film. In this respect, reference is only made to DE 37 41 582 A1, WO 2004/71748 A1 or U.S. Pat. No. 5,970,589 by way of example.

FIG. 2 shows a conventional guide rail 7 of the guide rail arrangement 7 in a fundamental perspective view on which the tenter-clip conveyor systems KT, which are also referred to below as tenter-clip carriages 13 (see FIG. 3), are movably guided. Such a guide rail 7 is usually held on the side remote from the film, i.e. the so-called rear side of the guide rail 7, via a support device 9 that is only indicated in FIG. 2 in a basic and abstract manner.

FIG. 3 shows a corresponding section of a guide track 2 with the aforementioned guide rail 7, on which a section of a chain system 11 is also shown as a circulating conveyor system 3, namely together with a tenter-clip carriage 13, shown in detail, as a tenter-clip conveyor unit KT.

On the basis of FIG. 4, a cross section perpendicular to the plane of the guide rail is reproduced in relation to the illustration according to FIG. 3, specifically with a plan view of a tenter-clip carriage 13.

The following structure can be seen in particular in the illustration according to FIGS. 3 and 4:

The guide rail 7 has an upper load-bearing rail surface 7a that is generally oriented horizontally and points upwards. Opposite to this, the guide rail 7 has a downwardly facing opposing rail surface 7b. This opposing rail surface is preferably also aligned horizontally and runs parallel to the upper load-bearing rail surface 7a.

Furthermore, the guide rail 7, which is preferably rectangular in cross section, has two rolling or sliding surfaces 7c, 7d, which generally run vertically. These rolling or sliding surfaces are a rolling or sliding surface 7c facing away from or remote from the film and a rolling and/or sliding surface 7d on the film side. As shown in the figures, the clip 15 is arranged on the tenter-clip carriage 13 on the film side (but can also be designed as one part with the tenter-clip carriage 13) in order to, for example, hold a film edge 17 of a film MB or a material web MB clamped between a clip table 15a and a lower clamping portion 15'b of a clamping lever 15b. The film and/or stretching forces introduced to the tenter-clip carriage 13 via this are then supported primarily on the rolling and/or sliding surface 7c remote from the film or facing away from the film by means of rollers 19c remote from the film or sliding elements 19c remote from the film.

The rollers 19c or sliding elements 19c comprise in particular at least one upper roller 19c' or one upper sliding element 19c' and at least one lower roller 19c" or lower sliding element 19c". The at least one upper roller 19c' or the at least one upper sliding element 19c' is arranged or may be arranged closer to the upper load-bearing rail surface 7a than the at least one lower roller 19c" or the at least one lower sliding element 19c". In contrast, the at least one lower roller 19c" or the at least one lower sliding element 19c" is arranged or may be arranged closer to the opposing rail surface 7b than the at least one upper roller 19c' or the at least one upper sliding element 19c'. There are preferably two upper rollers 19c' and two lower rollers 19c" or sliding elements 19c', 19c". These would then, in particular, only be spaced apart from one another in the longitudinal direction and preferably not in the vertical direction of the tenter-clip carriage 13.

Furthermore, in principle one or more upper weighted rollers 19a and/or upper weighted sliding elements 19a that are offset in the direction of the guide rail and via which the weight, i.e. the weight force of the respective tenter-clip carriage 13, is supported on the guide rail 7, are provided in the illustrated embodiment. The upper weighted roller or rollers 19a are therefore also referred to as load-bearing or weighted wheels or rollers. In the case of weighted sliding elements, they may also be referred to as load-bearing sliding elements.

The at least one securing roller 19b, which is located below relative thereto, or the at least one securing sliding element 19b, is mounted on the tenter-clip carriage 13 to achieve positive lock protection against unintentional and undesired rising of the conveyor unit KT in such a way that possibly small and preferably defined and fixed spacing 21 is formed between the at least one securing roller 19b in question or the at least one securing sliding element 19b in question and the downwardly facing opposing rail surface 7b. The rollers 19c, 19c', 19c" and/or the weighted roller 19a and/or the securing roller 19b in FIG. 4 are partially covered by the holding and bearing portions of the tenter-clip carriage 13 and may only be seen in portions.

A plurality of upper and/or lower rollers 19c, 19c', 19c" and/or sliding elements 19c, 19c', 19c", which roll or slide on this rolling surface and, as mentioned above, absorb the force of the film MB or the stretching force, are then usually arranged on the rolling or sliding surface 7c facing away from the film.

At least one stabilising roller 19d or at least one stabilising sliding element 19d, which will be explained in more detail below, is preferably provided on the opposite rolling or sliding surface 7d on the film side, on the one hand generally facing the upper edge of the guide rail 7 and on the other hand generally associated with the lower guide rail edge.

Otherwise, the corresponding sleeves 11d and other parts of the conveyor chain arrangement 11 running parallel to the guide rail 7, i.e. the chain system 11, via which the individual tenter-clip carriages 13 are successively connected, can be seen in the cross-sectional view according to FIG. 3.

In the context of the invention, reference is made to a partial chain portion 11'. The partial chain portion 11' is part of the conveyor chain arrangement 11. The partial chain portion 11' is the part of the conveyor chain arrangement 11 on which the tenter-clip carriage 13 is arranged.

The partial chain portion 11' comprises a plurality of chain segments $11_1$, $11_2$, wherein each chain segment $11_1$, $11_2$ is connected at one end to an adjacent chain segment $11_1$, $11_2$ by means of a pin 11c. Each chain segment $11_1$, $11_2$ comprises two chain links 11a spaced parallel to one another and each having two fastening openings that are connected to one another via the respective pin 11c with two other chain links 11a spaced parallel to one another of another chain segment $11_1$, $11_2$. A spacer 11b, in particular in the form of a protective roller, rests between the two innermost chain links 11a of the chain segments $11_1$, $11_2$ connected to one another in the region of their fastening openings, wherein the pin 11c passes through the spacer 11b.

In particular, between the pin 11c and the spacer 11b there is also a sleeve 11d that ends in the region of the fastening openings of the two innermost chain links 11a and is preferably flush with the top of a chain link 11a.

FIG. 5 shows a plan view of a horizontal cross section through the guide rail 7 and the associated tenter-clip carriage 13 and illustrates the structure and arrangement of the stabilising roller 19d according to the invention, wherein FIG. 6 shows a detail of a spatial representation of the stabilising roller 19d and FIG. 7 shows the installation thereof on the tenter-clip carriage 13 in detail.

The following overall structure can be seen in the illustrations according to FIG. 4 et seq.

As mentioned above, the tenter-clip carriages 13 are equipped to absorb the main load of the film transverse force and thus the stretching force on the side facing away from the film with rigid rollers 19c, i.e. that are not spring-loaded and do not permit compensating movements, wherein these rollers 19c or, if provided, the corresponding sliding elements 19c, are kept in contact on the surface 7c of the guide rail 7 facing away from the film.

The securing roller 19b provided opposite the upper weighted roller 19a or opposite the weighted sliding element 19a on the underside 7b of the guide rail 7, or a securing sliding element 19b that may be provided there, only serves, as mentioned above, to achieve positive locking so that the transport chain cannot rise up against the weight force in the event of malfunctions. Because the contact with a securing roller 19b provided here or a securing sliding element 19b on the downwardly facing opposing rail surface 7b is only used for safety purposes in the above-mentioned extreme case, the aforementioned spacing 21 may be provided there. If constant contact between the opposing rail surface 7b and the securing roller 19b or the securing sliding element 19b (opposing sliding element) were preferred here, this securing roller 19b or the securing sliding element 19b would also have to be realised while allowing an adjustment movement towards and away from this downwardly facing opposing rail surface 7b, wherein the securing roller 19b or the securing sliding element 19b should and would have to be pretensioned here under the action of a spring-force accumulator on the corresponding downwardly facing opposing rail surface 7b.

Otherwise, as an alternative to prevent rising through-out the entire system, an inclined run could also be preset with respect to the rollers 19c acting on the lateral guide rail surfaces where the axes of rotation of the rollers 19c are inclined in the running direction in order to generate a downward force component.

In order to implement the stabilisation of a corresponding clip body provided within the scope of the invention, at least one stabilising roller 19d, preferably two stabilising rollers 19d', 19d" arranged one above the other (spaced apart in the vertical direction), are provided per clip body, which stabilising rollers are pretensioned on the guide surface 7d facing the film under the action of a force accumulator or spring-force accumulator 23 on this rolling or sliding surface 7d at least with a force component in order thereby to be kept in contact with this rolling or sliding surface 7d. They are mounted in a variable position with respect to the clip body or tenter-clip carriage 13 that carries them.

The direction of the spring force could also be varied such that not only is the stabilising roller 19, 19d', 19d" subjected to a transverse force, but part of the spring force acts on the guide device 20 in or against the direction of travel of the clip.

Because the guide rail 7 usually has a rolling surface height that significantly exceeds the roller width, at least the aforementioned two stabilising rollers 19d, 19d', 19d" are preferably provided, wherein one stabilising roller 19d, 19d' is arranged closer to the upper load-bearing rail surface 7a, whereas the at least one second stabilising roller 19d, 19d" is mounted and held, i.e. provided, below this on the tenter-clip carriage 13, namely closer to the downwardly facing rolling surface 7b.

The securing roller 19b provided at the bottom in the embodiment shown according to FIG. 4 can optionally also be suspended, supported and mounted movably in order to bridge or prevent a possible play between the roller surface and the downwardly facing opposing rolling surface 7b. Likewise, this securing roller 19b may be firmly anchored or suspended in order to thereby absorb process forces.

In the embodiment shown, the stabilising roller 19d is rotatably mounted on a pivot lever 25, wherein the pivot lever 25 is pivotable about a lever axis 27 with respect to the tenter-clip carriage 13. The rotation axis 29 of the stabilising roller 19d is aligned parallel to the lever axis 27 and thereby parallel to the guide rail 7 and in particular the film-side guide rail surface 7d.

In other words, these axes of rotation are thus also aligned parallel to the rigid rollers 19c, 19c', 19c" rolling on the opposite rolling surface 7c.

In the illustrated embodiment, the pivot lever 25 thus serves as a guide device 20 via which the movement path of the stabilising roller 19d (or a stabilising sliding element 19d) to which force is applied is made possible.

It should be noted that this alignment of the axes parallel to the rolling or sliding surface of the guide rail 7 applies when the rolling surface of the stabilising roller 19d is cylindrical. Should the rolling surface be conical, the lever axis 27 and the rotation axis 29 would run parallel to the central axis through the conical rolling surface of the stabilising roller 19d.

In the embodiment shown, the one-armed pivot lever 25 is designed in such a way that it has a lever end 25a starting from the lever axis 27 and protruding beyond the rotation axis 29 provided at a, for example central, holding position 28 (on which rotation axis the stabilising roller 19d is held and mounted in a freely rotatable manner), which is engaged by a spring device 23a as a compression spring device or in general as a spring-force accumulator 23 at an application point 30, which spring device is supported on an opposite clip-side stop 15c. In FIG. 5, the spring 23' protrudes only in part from a spring holder or receptacle and is therefore hardly visible. As a result, the pivot lever 25 is preferably pretensioned in the direction of the film-side rolling surface 7d with a preselectable or presettable application of force, wherein the corresponding forces then keep the aforementioned stabilising roller 19d pressed against the film-side rolling surface 7d using appropriate leverage.

As can be seen in particular from the three-dimensional representation according to FIG. 6 and FIG. 7, the one-armed lever 25 in this embodiment is designed as a double lever 25 that comprises an upper lever portion 25' and a lower lever portion 25" parallel thereto that usually run parallel to one another, i.e. at the same distance from one another, and are congruent in design in a plan view parallel to the lever axis 27. At the free lever end 25a, the two lever sections 25' and 25" are connected to one another via a connecting element 25b acted upon by the force accumulator or spring-force accumulator 23. Both lever sections 25' and 25" are connected opposite to the connecting portion 25b on the common pivot axis or on an axle body 27' forming the common pivot axis. The aforementioned stabilising roller 19d is mounted in the space thus formed between the two pivot lever portions 25' and 25" arranged offset from one another in the axial direction of the lever axis 27, wherein the pivot axis is held and anchored on the two offset pivot lever portions 25' and 25".

The structure described causes a stable equilibrium due to the triangular engagement points for the lever connection, i.e. the connection of the pivot lever 25 to its lever axis 27, the attachment point of the suspension 23a and the contact point of the stabilising roller 19d on the associated rolling surface 7d of the guide rail 7. In addition, the two rollers 19c, 19c', 19c" on the side remote from the film and the stabilising roller 19d on the film side are, in a plan view, also arranged in a triangular manner with respect to one another, resulting in optimal stabilisation.

In addition, this illustrated arrangement leads to the result that the coefficient of friction of the bearing has a very small influence on the contact pressure and thus stabilisation forces.

It should be noted, however, that other lever arrangements are also possible in which the fulcrum of the lever is in the middle, i.e. a two-armed lever is formed in which the corresponding stabilising roller 19d is rotatably mounted on the one lever arm and the force accumulator 23 is provided on the opposite lever arm and acts on the pivot lever 25.

Finally, it should also be mentioned that not only can two preferably spring-loaded stabilising rollers 19d, 19d', 19d" arranged one above the other be provided, but it is also possible to provide two preferably spring-loaded and thus yieldably held stabilising rollers 19d offset one behind the other in the direction of the guide rail, for example, on the one hand more towards the top and on the other hand more towards the bottom, such that these stabilising rollers 19d, 19d', 19d" do not, as in the embodiment shown in FIG. 5, engage on the rolling rail 7 approximately in the centre of the two rollers 19c rigidly mounted on the opposite side, but rather each of the aforementioned stabilising rollers 19d, 19d', 19d" is attached to the guide rail 7 more or less opposite the rigid rollers 19c, 19c', 19c" provided on the other side.

In addition, the stabilising rollers may also be positioned in other ways. It is also possible to dispense with a pivot lever and instead provide a guide device 20 for the stabilising roller 19d that is adjustable transversely and in particular vertically or at least with a movement component transversely to the guide rail 7 towards it or over a certain distance away from it, namely under the action of a force accumulator 23 or force accumulator spring device applying force to the stabilising roller 19d in the direction of the guide rail 7.

Instead of such a rather linear guide device 20 for adjusting the stabilising roller 19d, to which force is applied and which is in particular spring-loaded, an arrangement can also be used in which the stabilising roller 19d is movable on a tiltable axis towards the guide rail 7, i.e. at least over a certain distance away from the guide rail 7 and towards it (with the application of force).

Finally, it should also be mentioned that, in addition to the spring device, a damping device 33 can also be provided that is preferably installed parallel to the spring travel or at least acts with a component parallel to the spring travel in order to optimise the vibration characteristics of the stabilising roller. In the embodiment shown according to FIG. 5, the aforementioned damping device 33 is implemented together with the spring device 23a, for example in the form of the force accumulator or spring-force accumulator 23.

If the aforementioned chain 11 or the aforementioned chain links is or are rigidly connected to the respective tenter-clip carriage 13, the connection of the suspension, i.e. the support of the force accumulator or spring-force accumulator 23, could not only take place against a stop 15c on the tenter-clip carriage 13 itself but also indirectly via the chain 11 or the chain links on the clip because in this case the chains cannot perform any compensating movement relative to the tenter-clip carriage 13 due to the spring-force accumulator.

In principle, all other suitable types of springs can also be used instead of the aforementioned force accumulator or spring-force accumulator 23, preferably in the form of a spring device 23a. For example, a leaf spring may also be used as a resilient element for the pivot lever 25. Finally, the pivot lever 25 could even be designed as a resilient element itself. There are no restrictions in this regard.

It is further noted that instead of one or the other aforementioned stabilising roller 19d, a stabilising sliding element 19d can be used that is for example rigidly attached to the pivot lever 25 such that when it is placed on the corresponding film-side rolling or sliding surface 7d it is set down parallel thereto. Otherwise, a corresponding flat sliding element on the pivot lever 25 could also be held by means of a pivot or tilt axis 29, such that the sliding element may be pivoted at least about said pivot or tilt axis 29 within a certain sufficient angle dimension. It would then be possible for the flat sliding element to be able to automatically align itself over the entire surface of the rolling or sliding surface 7d of the guide rail.

With regard to the clip or tenter-clip carriage 13, which is also sometimes referred to as a clip body 13, it should also be noted that it has a longitudinal direction LR running in the direction of movement, i.e. in the direction of the guide rail 7, and a transverse direction QR running perpendicular thereto, i.e. also perpendicular to the guide rail 7 (i.e. perpendicular to the film-side rolling surface 7d or perpendicular to the rolling surface 7c remote from the film). The longitudinal direction LR thus runs between a leading side 13a (i.e. along the guide rail 7 in the direction of movement of the tenter-clip carriage 13) and a trailing side 13b facing opposite to the direction of travel. The transverse direction QR, on the other hand, runs perpendicularly to the longitudinal direction LR between a laterally aligned clamping side 13c (which is on the film side and on which the film edge is clamped and held accordingly at the clip 15) and a guide rail side 13d opposite the material web MB to be stretched (see FIG. 5). The one or possibly two or more stabilising rollers 19d mentioned above can preferably be arranged rather on the upper side 13e of the tenter-clip carriage 13 and/or rather on the underside 13f of the tenter-clip carriage 13, without this being mandatory.

Furthermore, reference is also made to FIG. 8, in which, in deviation from FIG. 2, a guide rail arrangement comprising two guide rail portions 7' and 7" is shown in the form of a duo guide rail, wherein the two guide rail portions 7' and 7" are preferably designed or arranged with a vertical offset and form a guide rail spacing 41 between them. The guide rail portions 7', 7" may in turn be held via a common or separate support device 9.

A correspondingly adapted conveyor chain arrangement 11 may also be moved with such a design of the guide rail 7, as is now shown, for example, with reference to FIG. 9.

The structure and mode of operation basically correspond to the described embodiment according to FIG. 3. The main difference is only that the upper rear rollers 19c, i.e. which face away from the film, do not overlap the upper rolling surface 7a (as in the embodiment according to FIG. 3), but overlap underneath through the guide rail spacing 41, whereas the lower rollers 19c rolling on the side facing away from the film, in deviation from FIG. 3, do not overlap underneath the mono-guide rail 7 there, but rather overlap over the lower guide rail portion 7" through the guide rail spacing 41.

The mode of operation is basically comparable to the previous embodiment, whereas a function reversal occurs insofar as the upwardly facing rail or load-bearing rail surface 7a is designed on the lower guide rail portion 7" and the downwardly facing opposing rail surface 7b, which only serves to secure against lifting of the clip body or the tenter-clip carriage, is now formed on the upper guide rail portion 7'. Here, the spacing 21 described in conjunction with FIG. 4 can be provided between the securing roller 19b and the opposing rail surface 7b. In this variant too, individual or several of the aforementioned rollers 19a, 19b, 19c and/or 19d may also be designed as sliding elements.

In this variant, the at least two securing rollers 19d or securing sliding elements 19d can in part rest with the corresponding rolling or sliding surface 7d on the upper guide rail portion 7' and in part on the lower guide rail portion 7" and interact therewith.

In addition to or deviating from the illustrated structure of the tenter-clip carriage 13 with the aforementioned guide device 20 for the stabilising roller 19d, 19d', 19d" that is subjected to force or the stabilising sliding element 19d that is subjected to force, said guide device 20 having the associated illustrated components, in particular in the form of the aforementioned stabilising roller 19d, 19d', 19d" or the aforementioned stabilising sliding element 19d can, in deviation, not be attached directly but only indirectly to the tenter-clip carriage 13 itself. In this case, the stabilising roller 19d, 19d', 19d" or the at least one stabilising sliding element 19d is indirectly held on the tenter-clip carriage 13 via the pin 11c of the conveyor chain arrangement 11 that connects two chain segments $11_1$, $11_2$ of the partial chain portion 11' of the conveyor chain arrangement 11 to one another. The pin 11c is preferably firmly connected, in particular screwed, to a fastening portion of the tenter-clip carriage 13. The pin 11c could also simply be inserted into a corresponding opening in the tenter-clip carriage 13 and be supported on it and just not screwed in. The pin 11c may therefore also be regarded as part of the tenter-clip carriage 13. The tenter-clip carriage 13 is connected to the conveyor chain arrangement 11 by means thereof. This situation is shown in FIGS. 10 and 11.

One of the aforementioned pins 11c can be used as the axis of rotation or lever axis 27 for the guide device 20, i.e. the pivot lever or the pivot lever arrangement 25. The stop 15c of the spring-force accumulator 23 mentioned with reference to the previous embodiments could in this case be provided on the second, i.e. on an adjacent pin 11c, and thus indirectly on the same clip or on the same tenter-clip carriage 13. The support on the partial chain portion 11' has already been explained above.

The stabilising roller 19d, 19d', 19d" or the at least one stabilising sliding element 19d could also not be arranged in the middle of the clip body in the direction of travel, but instead between the clip bodies. In this case, the pin 11c of one clip is used for the lever axis 27 and the facing pin 11c of the adjacent clip is used as the stop 15c.

In FIG. 12, the pivot lever 25 is shown in the form of the double pivot lever. On the pivot axis, the double pivot lever is arranged to be supported both on the partial chain portion 11' and on the tenter-clip carriage 13. The pin 11c passes through the double pivot lever on its pivot axis.

The modification explained above can be implemented particularly favourably if the aforementioned partial chain portion 11' is firmly connected to the tenter-clip carriage 13.

A pair of rollers 19c, 19c' and/or sliding elements 19c that are offset in the direction of the guide rail arrangement 7 are preferably arranged on the tenter-clip carriage 13 closer to the upper load-bearing rail surface 7a than to the opposing rail surface 7b. In contrast, a pair of rollers 19c, 19c" and/or sliding elements 19c that are offset in the direction of the guide rail arrangement 7 are arranged on the tenter-clip carriage 13 closer to the opposing rail surface 7b. A stabilising roller 19d, 19d', 19d" or a stabilising sliding element 19d is provided on the tenter-clip carriage 13 between the rollers 19c, 19c', 19c" and/or sliding elements 19c of the one and/or the other pair of rollers 19c, 19c', 19c" and/or sliding elements 19c on the opposite side of the guide rail arrangement 7. The at least one stabilising roller 19d, 19d', 19d" or the at least one stabilising sliding element 19d is, via the guide device 20, adjustably pretensioned in the direction of the rolling and/or sliding surface 7d arranged on the film side.

According to FIGS. 13 and 14, it is also possible for a plurality of stabilising rollers 19d, 19d', 19d" to be used, wherein at least one stabilising roller 19d, 19d', 19d" is arranged on the side facing the film and one stabilising roller 19d, 19d', 19d" is arranged on the side facing away from the material web. These (at least two) stabilising rollers 19d, 19d', 19d" are arranged offset from one another in the height direction. One stabilising roller 19d, 19d' is arranged closer to the upper load-bearing rail surface 7a of the guide rail 7 of the guide rail arrangement 7 than the other stabilising roller 19d, 19d" and the other stabilising roller 19d, 19d" is arranged closer to the (lower) opposing rail surface 7b of the guide rail 7, which opposing rail surface is arranged opposite to the upper load-bearing rail surface 7a. In the illustrated embodiment from FIG. 13, a stabilising roller 19d, 19d' is arranged in the region of the load-bearing rail surface 7a of the guide rail 7 on the side of the guide rail 7 facing the film. In contrast, the other stabilising roller 19d, 19d" is arranged in the region of the opposing rail surface 7b of the guide rail 7 on the side of the guide rail 7 remote from the film. This could also be the other way around. The stabilising roller 19d, 19d', 19d" that is arranged (more closely) at the level of the material web MB is preferably arranged on the side of the guide rail 7 facing the film.

In this case, the rollers 19c, 19c', 19c" or the sliding elements 19c are also arranged both on the side of the guide rail 7 facing the film and on the side remote from the film. The respective one roller 19c, 19c', 19c" or a pair of rollers 19c, 19c', 19c" or sliding elements 19c is arranged approximately (rejection less than +−20%) at the level of the respective stabilising roller 19d, 19d', 19d", but on the other side of the guide rail 7. An offset in the longitudinal direction LR of the tenter-clip carriage 13 is possible. The guide rail 7 runs between the roller 19c, 19c', 19c" and the corresponding stabilising roller 19d, 19d', 19d" or the stabilising sliding element 19d. In the embodiment of FIG. 13, the roller 19c, 19c' or the pair of rollers 19c, 19c' or sliding elements 19c that is arranged in the region of the load-bearing rail surface 7a of the guide rail 7 is arranged on the side of the guide rail 7 remote from the film. In contrast, the roller 19c, 19c" or the pair of rollers 19c, 19c" or sliding elements 19c that is arranged in the region of the opposing rail surface 7b of the guide rail 7 is arranged on the side of the guide rail 7 facing the film. This could also be the other way around. Preferably, the roller 19c, 19c' or the pair of rollers 19c, 19c' or sliding elements 19c that is arranged (more closely) at the level of the material web MB is arranged on the side of the guide rail 7 remote from the film.

In principle, however, all stabilising rollers 19d, 19d', 19d" could also be arranged on the side facing the film or on the side of the guide rail 7 remote from the film, whereas all rollers 19c, 19c', 19c" or sliding elements 19c are arranged on the opposite side of the guide rail 7. These could then be arranged on the side of the guide rail 7 remote from the film or on the side of the guide rail 7 facing the film.

The tenter-clip carriage 13 further comprises an upper portion and a lower portion that protrude from an upper and a lower part of the clip body 13 and are designed to engage around the guide rail arrangement 7. The upper guide roller 19c, 19c' is preferably arranged on the upper portion and the lower guide roller 19c, 19c" on the lower portion. The stabilising rollers 19d, 19d', 19d" are also preferably arranged on the one hand on the upper portion and on the other hand on the lower portion.

The invention is not restricted to the embodiments described. In the context of the invention, all of the described and/or depicted features can be combined with one another in any manner.

The invention claimed is:

1. A tenter-clip carriage for a stretching system, comprising the following features:
   the tenter-clip carriage has a longitudinal direction and a transverse direction,
      a. wherein the longitudinal direction runs between a leading side and a trailing side opposite thereto; and
      b. wherein the transverse direction runs transversely or perpendicularly to the longitudinal direction between a clamping side for a material web to be stretched and a guide rail side opposite thereto;
   the tenter-clip carriage comprises a clip body, wherein the clip body has a clamping device via which a material web edge of a material web to be stretched can be clamped;
   the tenter-clip carriage comprises fastening portions in order to fasten the tenter-clip carriage to a partial chain portion of a conveyor chain arrangement of the stretching system;
   the tenter-clip carriage comprises at least one stabilising roller or at least one stabilising sliding element;
   the at least one stabilising roller or the at least one stabilising sliding element is, by means of a guide device:
      a) held directly on the tenter-clip carriage; or
      b) held indirectly on and/or connected to the tenter-clip carriage via a pin that connects two chain segments of the partial chain portion of the conveyor chain arrangement to one another;
   and, specifically, unaffected by the feed and drive forces acting on the tenter-clip carriage or the partial chain portion to move the tenter-clip carriage and/or the partial chain portion, and
   the at least one stabilising roller or the at least one stabilising sliding element can be adjusted perpendicularly or transversely to the longitudinal direction;
   for the at least one stabilising roller or the at least one stabilising sliding element, a force accumulator or spring-force accumulator is provided via which the at least one stabilising roller or the at least one stabilising sliding element is held forcibly in a yieldable manner and/or held in a pretensioned manner with a predeterminable or presentable force away from the clamping side in the direction of the guide rail side opposite the tenter-clip carriage and/or opposite the partial chain portion of the conveyor chain arrangement.

2. The tenter-clip carriage according to claim 1, wherein a damping device is also provided that acts on the at least one stabilising roller or the at least one stabilising sliding element at least indirectly to reduce vibration characteristics.

3. The tenter-clip carriage according to claim 2, wherein the damping device is part of the force accumulator or spring-force accumulator.

4. The tenter-clip carriage according to claim 1, wherein the guide device comprises a pivot lever that is pivotable about a lever axis with respect to the tenter-clip carriage and/or the pin of the partial chain portion away from the clamping side in the direction of the guide rail side and vice versa at least with one movement component, wherein at least the at least one stabilising roller or the at least one stabilising sliding element is held in a holding position offset to the lever axis.

5. The tenter-clip carriage according to claim 4, wherein the pivot lever is designed as a one-armed pivot lever, and in that the force accumulator or spring-force accumulator also attaches to an application point on the pivot lever, wherein the holding position for the stabilising roller or the stabilising sliding element and the application point for the force accumulator or spring-force accumulator are provided offset to the lever axis, wherein
   a) the holding position is closer to the lever axis than the application point, or
   b) the holding position is farther away from the lever axis than the application point, or
   c) the holding position and the application point are provided at the same point on the pivot lever.

6. The tenter-clip carriage according to claim 4, wherein the pivot lever is designed as a double-armed pivot lever, on one lever arm of which the stabilising roller or the stabilising sliding element is provided and on the lever arm of which opposite to the lever axis the attachment point for the force accumulator or spring-force accumulator is provided.

7. The tenter-clip carriage according to claim 5, wherein the stabilising roller or the stabilising sliding element is rotatably mounted on the pivot lever or at least held on the pivot lever such that it is pivotable over an angle range.

8. The tenter-clip carriage according to claim 4, wherein the pivot lever is designed as a double lever or a pair of levers that comprises two pivot lever portions arranged one above the other and axially offset in the direction of its pivot axis, between which the at least one stabilising roller or the at least one stabilising sliding element is held.

9. The tenter-clip carriage according to claim 8, wherein the double lever is connected to an associated axle body on the side of its pivot axis and via a connecting element on the opposite side.

10. The tenter-clip carriage according to claim 1, wherein the force accumulator or spring-force accumulator:
   a) is supported on the clip body; or
   b) is supported on a further pin that connects two other chain segments of the partial chain portion of the conveyor chain arrangement to one another.

11. The tenter-clip carriage according to claim 10, wherein the pin and/or the further pin is firmly connected to the fastening portion of the tenter-clip carriage.

12. The tenter-clip carriage according to claim 1, wherein:
   the tenter-clip carriage comprises at least one roller or at least one sliding element;
   the at least one roller or the at least one sliding element is arranged on the tenter-clip carriage in such a way that it can be brought into contact with a rolling or sliding surface on a side remote from the material web or with a rolling and/or sliding surface of a guide rail arrangement on the material web side, whereas the at least one stabilising roller or the at least one stabilising sliding element can be brought into contact with the other material web-side rolling and/or sliding surface or rolling or sliding surface on the side remote from the material web.

13. The tenter-clip carriage according to claim 12, wherein:
   the tenter-clip carriage comprises an upper portion and a lower portion that protrude from an upper and a lower part of the clip body and are designed to engage around the guide rail arrangement;
   the tenter-clip carriage comprises at least one upper roller and one lower roller or an upper sliding element and a lower sliding element;
   the at least one upper roller or the at least one upper sliding element is arranged on the upper portion or on the upper part of the tenter-clip carriage in such a way that:
     a) it can be brought into contact with an upper region of the rolling or sliding surface of the guide rail arrangement on the side remote from the material web; or
     b) it can be brought into contact with an upper region of the material web-side rolling and/or sliding surface of the guide rail arrangement;
   the at least one lower roller or the at least one lower sliding element is arranged on the lower portion or on the lower part of the tenter-clip carriage in such a way that
     a) it can be brought into contact with a lower region of the rolling or sliding surface of the guide rail arrangement on the side remote from the material web; or
     b) it can be brought into contact with an upper region of the material web-side rolling and/or sliding surface of the guide rail arrangement;
   a further stabilising roller or a further stabilising sliding element is provided and, by means of a guide device:
     a) held directly on the tenter-clip carriage; or
     b) held indirectly on the tenter-clip carriage via the pin or the further pin that connects two chain links the partial chain portion of the conveyor chain arrangement to one another,
   the at least one stabilising roller and the one further stabilising roller are arranged one above the other or offset one above the other; and
   the upper and lower rollers can both be brought into contact with the rolling or sliding surface on the side remote from the material web or with the material web-side rolling and/or sliding surface; or
   the upper roller can be brought into contact with the rolling or sliding surface on the side remote from the material web or with the material web-side rolling and/or sliding surface and the lower roller can be brought into contact with the opposite rolling and/or sliding surface or with the rolling or sliding surface on the side remote from the material web;
   the at least one stabilising roller and the one further stabilising roller can both be brought into contact with the rolling or sliding surface on the side remote from the material web or with the material web-side rolling and/or sliding surface; or
   the at least one stabilising roller can be brought into contact with the rolling or sliding surface on the side remote from the material web or with the material web-side rolling and/or sliding surface and the one further stabilising roller can be brought into contact with the opposite film-side rolling and/or sliding surface or with the rolling or sliding surface on the side remote from the material web.

14. The tenter-clip carriage according to claim 13, wherein:
   the tenter-clip carriage comprises an upper weighted roller or an upper weighted sliding element, wherein the upper weighted roller or the upper weighted sliding element is arranged on the upper portion or on the upper part of the tenter-clip carriage in such a way that the upper weighted roller or the upper weighted sliding element can be brought into contact with an upper load-bearing rail surface of the guide rail arrangement; and/or the tenter-clip carriage comprises a securing roller or a securing sliding element, wherein the securing roller or the securing sliding element is arranged on the lower portion or on the lower part of the tenter-clip carriage in such a way that the securing roller or the securing sliding element can be brought into contact with an opposing rail surface of the guide rail arrangement.

15. A set comprising a tenter-clip carriage according to claim 1, and at least one partial chain portion of a conveyor chain arrangement comprising the following features:
the partial chain portion comprises a plurality of chain segments, wherein each chain segment is connected at one end to an adjacent chain segment by a pin;
each chain segment comprises two chain links spaced parallel to one another and each having two fastening openings that are connected to one another via the pin with two other chain links spaced parallel to one another;
a spacer, rests between the two innermost chain links of the chain segments connected to one another in the region of their fastening openings, wherein the pin passes through the spacer.

16. The set according to claim 15, comprising the following feature:
between the pin and the spacer there is also a sleeve that ends in the region of the fastening openings of the two innermost chain links.

17. A stretching system comprising a plurality of tenter-clip carriages that are constructed according to claim 1, comprising the following features:
two circumferential guide tracks that are arranged with a lateral offset transversely to an extraction direction of a material web to be stretched;
a circumferential conveyor system having a plurality of tenter-clip conveyor units is arranged along each of the two guide tracks, with which circumferential conveyor system a material web to be stretched can be grasped from the side and passed through the stretching system from an inlet zone to an outlet zone;
the tenter-clip conveyor units each comprise a tenter-clip carriage;
the circumferential guide track comprises a guide rail arrangement along which the tenter-clip carriages are movable in a supported manner by means of rollers or sliding elements, or a weighted roller or a weighted sliding element, or a securing roller or a securing sliding element, or at least one stabilising roller or at least one stabilising sliding element;
the guide rail arrangement comprises at least one upwardly facing load-bearing rail surface and a rolling and/or sliding surface on the side remote from the material web and a rolling and/or sliding surface aligned on the material web-side;
rollers and/or sliding elements are rigidly mounted and/or held on the rolling and/or sliding surface aligned on the side remote from the material web, which rollers and/or sliding elements roll or slide on the rolling and/or sliding surface aligned on the side remote from the material web;
the at least one stabilising roller or at least one stabilising sliding element is provided on the rolling and/or sliding surface aligned on the side, which stabilising roller or stabilising sliding element is in contact with the rolling and/or sliding surface aligned on the material web side,
the at least one stabilising roller or the at least one stabilising sliding element can be adjusted perpendicularly or transversely to the guide rail arrangement and thus perpendicularly or transversely to the rolling and/or sliding surface ($7d$) aligned on the material web side.

18. The stretching system according to claim 17, wherein the following features:
the guide device comprises a pivot lever that is pivotable about a lever axis with respect to the tenter-clip carriage and/or the pin of the partial chain portion towards or away from the material web-side rolling and/or sliding surface of the guide rail arrangement with at least one movement component, wherein at least the at least one stabilising roller or the at least one stabilising sliding element is held in a holding position offset to the lever axis.

19. The stretching system according to claim 17, wherein:
the tenter-clip carriage comprises at least two stabilising rollers or stabilising sliding elements, wherein the at least one stabilising roller or the at least stabilising sliding element is arranged closer to the upper load-bearing rail surface, whereas the at least one further stabilising roller or the at least one further stabilising sliding element is arranged closer to a lower rolling or sliding surface.

20. The stretching system according to claim 17, wherein a pair of rollers and/or sliding elements are arranged on the tenter-clip carriage closer to the upper load-bearing rail surface and offset in the direction of the guide rail arrangement, and/or
in that a pair of rollers and/or sliding elements are arranged on the tenter-clip carriage closer to the opposing rail surface and offset in the direction of the guide rail arrangement,
and in that a stabilising roller or a stabilising sliding element is or are provided on the tenter-clip carriage between the rollers and/or sliding elements of the one and/or the other pair of rollers and/or sliding elements on the opposite side of the guide rail arrangement, wherein the at least one stabilising roller or the at least one stabilising sliding element is adjustably preloaded via a guide device in the direction of the rolling and/or sliding surface arranged on the material web side.

21. The stretching system according to claim 17, wherein the guide rail arrangement consists of a mono-rail, wherein the tenter-clip carriage is designed in such a way that it in part overlaps from above the upper load-bearing rail surface provided on the side remote from the material web and mounted on the tenter-clip carriage and in part overlaps the downwardly facing opposing rail surface from below.

22. The stretching system according to claim 17, wherein the guide rail arrangement is divided into two parts and consists of a duo-rail and comprises two guide rail portions are at least arranged one above the other with a vertical component or a vertical offset to form guide rail spacing, wherein the tenter-clip carriage is designed in such a way that the rollers or sliding elements provided on the side remote from the material web and acting on the rolling and/or sliding surface in part overlap the upper guide rail portion from below and in part overlap the lower guide rail portion from above.

23. The stretching system according to claim 17, wherein:
a) the individual tenter-clip carriages are part of the respective partial chain portion of the conveyor chain arrangement such that a force flux of the driven conveyor chain arrangement runs over the individual tenter-clip carriages, or
b) the conveyor chain arrangement is continuous, wherein the tenter-clip carriages are mounted as separate components with the respective partial chain portion of the conveyor chain arrangement and are not disposed in the force flux of the conveyor chain arrangement.

* * * * *